US010814511B2

(12) United States Patent
Waldrop, III et al.

(10) Patent No.: US 10,814,511 B2
(45) Date of Patent: Oct. 27, 2020

(54) SYSTEM AND METHOD FOR CUTTING MATERIAL IN CONTINUOUS FIBER REINFORCED ADDITIVE MANUFACTURING

(71) Applicant: The Boeing Company, Chicago, IL (US)

(72) Inventors: John C. Waldrop, III, St. Peters, MO (US); Daniel D. Bloch, St. Peters, MO (US); Michael W. Hayes, Belleville, IL (US); Loren J. Strahm, Glen Carbon, IL (US); Peter A. Szostak, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/215,419

(22) Filed: Dec. 10, 2018

(65) Prior Publication Data

US 2019/0105854 A1 Apr. 11, 2019

Related U.S. Application Data

(62) Division of application No. 14/948,057, filed on Nov. 20, 2015, now Pat. No. 10,150,262.

(51) Int. Cl.
*B29C 64/209* (2017.01)
*B26D 1/14* (2006.01)
(Continued)

(52) U.S. Cl.
CPC .............. *B26D 1/14* (2013.01); *B26D 1/143* (2013.01); *B26D 1/25* (2013.01); *B26D 1/46* (2013.01);
(Continued)

(58) Field of Classification Search
CPC ....... B29C 70/30; B29C 64/386; B29C 64/20; B29C 64/106; B29C 64/165;
(Continued)

(56) References Cited

U.S. PATENT DOCUMENTS 3,590,678 A * 7/1971 Hasten ................... B29B 9/065
83/593
4,802,838 A 2/1989 Schaaf
(Continued)

FOREIGN PATENT DOCUMENTS

EP 0116137 A1 8/1984
GB 2107638 A 5/1983
(Continued)

OTHER PUBLICATIONS

Garay, The American Saw Company, Jul. 11, 2012, Takeadip Vintage Tools (Year: 2012).*
(Continued)

*Primary Examiner* — Matthew J Daniels
*Assistant Examiner* — Andrew L Swanson
(74) *Attorney, Agent, or Firm* — Kwan & Olynick LLP

(57) ABSTRACT

Methods, apparatus, and systems for cutting material used in fused deposition modeling systems are provided, which comprise a ribbon including one or more perforations. Material is passed through at least one perforation and movement of the ribbon cuts the material. A further embodiment comprises a disk including one or more blade structures, each forming at least one cavity. Material is passed through at least one cavity and a rotational movement of the disk cuts the material. A further embodiment comprises a slider-crank mechanism including a slider coupled to a set of parallel rails of a guide shaft. The slider moves along a length of the rails to cut the material. Yet another embodiment comprises one or more rotatable blade structures
(Continued)

coupled to at least one rod. The rotation of the blade structures causes the blade structures to intersect and cut extruded material during each rotation.

20 Claims, 19 Drawing Sheets

(51) Int. Cl.
| | |
|---|---|
| B29C 48/00 | (2019.01) |
| B29C 70/38 | (2006.01) |
| B29C 70/54 | (2006.01) |
| B26D 1/143 | (2006.01) |
| B26D 1/46 | (2006.01) |
| B33Y 40/00 | (2020.01) |
| B29C 64/165 | (2017.01) |
| B29C 48/02 | (2019.01) |
| B29C 48/25 | (2019.01) |
| B29C 64/118 | (2017.01) |
| B33Y 10/00 | (2015.01) |
| B33Y 30/00 | (2015.01) |
| B33Y 50/02 | (2015.01) |
| B33Y 70/00 | (2020.01) |
| B26D 1/25 | (2006.01) |
| B26D 3/16 | (2006.01) |
| B26D 5/00 | (2006.01) |
| B29C 69/00 | (2006.01) |
| B29C 70/16 | (2006.01) |
| B29C 70/30 | (2006.01) |
| B26D 1/00 | (2006.01) |
| B29C 48/30 | (2019.01) |
| B29C 48/345 | (2019.01) |
| B22D 11/01 | (2006.01) |
| B29K 71/00 | (2006.01) |
| B29K 105/00 | (2006.01) |
| B29K 105/10 | (2006.01) |
| B29K 307/04 | (2006.01) |

(52) U.S. Cl.
CPC ............. B26D 3/16 (2013.01); B26D 5/005 (2013.01); B29C 48/0022 (2019.02); B29C 48/02 (2019.02); B29C 48/266 (2019.02); B29C 64/118 (2017.08); B29C 64/165 (2017.08); B29C 64/209 (2017.08); B29C 69/001 (2013.01); B29C 70/16 (2013.01); B29C 70/30 (2013.01); B29C 70/382 (2013.01); B29C 70/545 (2013.01); B33Y 10/00 (2014.12); B33Y 30/00 (2014.12); B33Y 40/00 (2014.12); B33Y 50/02 (2014.12); B33Y 70/00 (2014.12); B22D 11/01 (2013.01); B26D 2001/006 (2013.01); B29C 48/30 (2019.02); B29C 48/345 (2019.02); B29K 2071/00 (2013.01); B29K 2105/0067 (2013.01); B29K 2105/10 (2013.01); B29K 2307/04 (2013.01)

(58) Field of Classification Search
CPC ... B29C 47/0066; B29C 69/001; B29C 70/16; B29C 70/382; B29C 70/545; B29C 48/0022; B29C 48/345; B29C 2793/00; B29C 2793/0027; B29C 2793/0063; B33Y 10/00; B33Y 30/00; B33Y 40/00; B33Y 50/02; B33Y 70/00; B26D 1/14; B26D 1/143; B26D 1/25; B26D 1/46; B26D 3/16; B26D 5/005; B26D 2001/006; B22D 11/01; B29K 2071/00; B29K 2105/0067; B29K 2307/04; B29B 2017/044; B29B 2017/048
See application file for complete search history.

(56) References Cited

U.S. PATENT DOCUMENTS

| | | | | |
|---|---|---|---|---|
| 5,593,702 | A * | 1/1997 | Harris | B29B 9/065 425/67 |
| 5,611,983 | A * | 3/1997 | Ma | B29B 9/065 264/142 |
| 5,641,529 | A * | 6/1997 | Kunas | A21C 11/10 426/516 |
| 7,261,546 | B1 * | 8/2007 | Willingham | B29C 31/048 425/311 |
| 10,150,262 | B2 | 12/2018 | Waldrop, III et al. | |
| 2009/0068464 | A1 | 3/2009 | Bowen | |
| 2010/0228384 | A1 | 9/2010 | Neumaier et al. | |
| 2014/0175695 | A1 * | 6/2014 | Eloo | B29B 17/0005 264/143 |
| 2015/0165666 | A1 | 6/2015 | Butcher et al. | |
| 2015/0290875 | A1 | 10/2015 | Mark et al. | |
| 2016/0346998 | A1 * | 12/2016 | Mark | B29C 70/20 |
| 2017/0144375 | A1 | 5/2017 | Waldrop, III et al. | |

FOREIGN PATENT DOCUMENTS

| | | |
|---|---|---|
| JP | S59143857 A | 8/1984 |
| JP | 63069607 A | 3/1988 |
| JP | 2000313007 A | 11/2000 |
| WO | 8606327 A1 | 11/1986 |

OTHER PUBLICATIONS

"U.S. Appl. No. 14/273,629, Non Final Office Action dated Jul. 5, 2018", 37 pages.
"U.S. Appl. No. 14/948,057, Examiner Interview Summary dated Jul. 5, 2018", 2 pages.
"U.S. Appl. No. 14/948,057, Non Final Office Action dated Apr. 2, 2018", 11 pages.
"U.S. Appl. No. 14/948,057, Notice of Allowance dated Aug. 6, 2018", 7 pages.
"U.S. Appl. No. 14/948,057, Requirement for Restriction dated Nov. 9, 2017", 8 pages.
"European Application Serial No. 16193921.0, Search Report dated May 4, 2017", 10 pgs.
Waldrop III, John C. et al., "Composite Feedstock Strips for Additive Manufacturing and Methods of Forming Thereof", U.S. Appl. No. 14/835,323, filed Aug. 25, 2015, 42 pgs.
Japanese Application Serial No. 2016-168999, Office Action dated Jun. 22, 2020, 10 pgs.

* cited by examiner

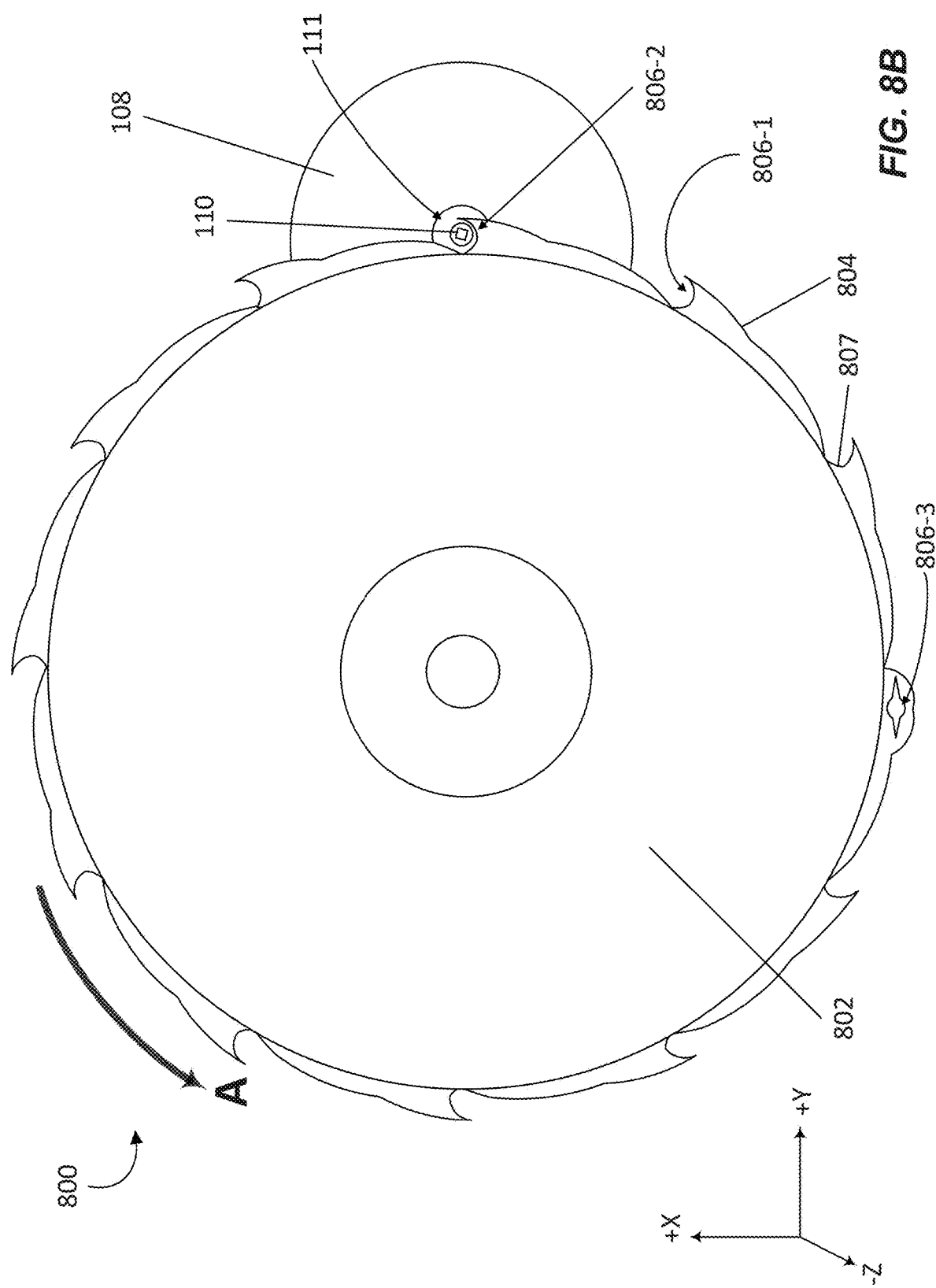

SYSTEM AND METHOD FOR CUTTING MATERIAL IN CONTINUOUS FIBER REINFORCED ADDITIVE MANUFACTURING

CROSS-REFERENCE TO RELATED APPLICATIONS

This application is a divisional of U.S. patent application Ser. No. 14/948,057, entitled: "System and Method for Cutting Material in Continuous Fiber Reinforced Additive Manufacturing", filed on Nov. 20, 2015, and issued as U.S. Pat. No. 10,150,262 on Dec. 11, 2018, which is incorporated herein by reference in its entirety for all purposes.

TECHNICAL FIELD

The present disclosure relates generally to additive manufacturing, and more specifically to the cutting of materials used in such manufacturing systems.

DESCRIPTION OF RELATED ART

In many manufacturing processes, materials may need to be shaped through various processes including melting, combining, and/or cutting. For example, fused deposition modeling (FDM), also known as fused filament fabrication (FFF), is an additive manufacturing process commonly used for modeling, prototyping, and production application. Such manufacturing processes are increasingly being used as a technique for 3D printing, modeling, and manufacturing. FDM works on an additive principle by laying down material in layers. A model and/or part is typically produced by extruding small flattened amounts of molten material and/or support material from an extrusion nozzle to form layers as the material hardens after extrusion from the nozzle.

Typically, the material, such as thermoplastic filament or metal wire is supplied to an extrusion nozzle which can turn the flow on and off. Thermoplastics may be heated past their glass transition temperature to a molten state and are then deposited by an extrusion head.

In some instances, it may be necessary to cut the extruded material at desired lengths during the additive manufacturing process. For example, if the extruded material is a fiber reinforced feedstock, simply halting of the fiber reinforced feedstock is insufficient for separating the feedstock from the extruder. Thus, in such cases, a cutting mechanism downstream of the extruder or nozzle is required for a clean separation of the feedstock. However, in the additive manufacturing process, the models and/or parts are assembled quickly in constricted spaces, and it may be impractical for cutting to be done manually or by typical cutting devices. Thus, there is a need for a device and method for cutting manufacturing materials in various manufacturing processes that is quick, automated, and not obstructive.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, certain embodiments of the present disclosure provide techniques or mechanisms for cutting material used in fused deposition modeling, and in particular for cutting fiber reinforced materials used in such manufacturing processes. According to various embodiments, a fiber reinforced feedstock cutting device is provided which comprises a feedstock pass through zone and a cutting mechanism. A portion of the cutting mechanism defines at least a partial perimeter of the feedstock pass through zone.

In some embodiments, the cutting mechanism comprises a ribbon including one or more perforations. A feedstock is passed through at least one perforation of the one or more perforations and movement of the ribbon cuts the feedstock. In some embodiments, the cutting mechanism may comprise one or more sharpened edges outlining each perforation. In further embodiments, the one or more perforations may be substantially teardrop shaped with respect to one direction. In other embodiments, the one or more perforations may be symmetrically shaped. In some embodiments, the cutting device may further comprise a set of rotatable reels coupled to the ribbon, and rotating at least one of the reels causes movement of the ribbon in one or more directions. In some embodiments, the cutting device may further comprise one or more motors coupled to at least one reel, and the one or more motors causes at least one reel to rotate. In other embodiments the cutting device may further comprise one or more guides. The ribbon passes through the one or more guides and remains within a predetermined space defined by the one or more guides. In some embodiments, each movement of the ribbon may cause at least one perforation to substantially align with at least one opening of an extruder in a fused deposition modeling system. In some embodiments, the extruder may include one or more openings. In some embodiments, the feedstock may comprise a continuous carbon fiber or other continuous fiber reinforced composite.

In yet another embodiment, the cutting mechanism comprises a disk including one or more blade structures. Each blade structure includes at least one cavity. A feedstock is passed through at least one cavity and a rotational movement of the disk cuts the feedstock. In some embodiments, the cutting mechanism may include one or more sharpened edges outlining each cavity. In further embodiments, one or more cavities may be substantially teardrop shaped with respect to one direction. In other embodiments, at least one cavity may comprise at least one fully enclosed perforation with each blade structure. In some embodiments, the cutting device may further comprise one or more motors coupled to the disk, and the one or motors causes the disk to rotate. In other embodiments, each rotational movement of the disk may cause at least one cavity to substantially align with at least one opening of an extruder in a fused deposition modeling system. In some embodiments, the extruder may include one or more openings. In some embodiments, the feedstock may comprise a continuous carbon fiber or other continuous fiber reinforced composite.

In yet another embodiment, the cutting mechanism comprises a guide shaft including a set of rails positioned in parallel. A feedstock is passed between the rails. The cutting device may further comprise a slider coupled to the rails such that the slider may move along a length of the rails from a first position to a second position. The cutting device may further comprise a crank mechanism coupled to the slider, and rotation of the crank mechanism causes the slider to travel the length of the rails and cut the feedstock passed between the rails. The slider may return to the first position after each full rotation of the crank mechanism. In some embodiments, the cutting mechanism may include one or more sharpened edges. In other embodiments, the cutting mechanism may further include an end structure coupled to the guide shaft. In another embodiment, the cutting mechanism may comprise a set of blade structures including the one or more sharpened edges. The blade structures are coupled to the slider, and the end structure is shaped such that the end structure causes the blade structures to come together and cut the feedstock when the slider is at the second position. In other embodiments, the cutting device may further comprise one or more motors coupled to the crank mechanism, and the one or more motors causes the crank to rotate. In some embodiments, the guide shaft may be substantially aligned with at least one opening of an extruder in a fused deposition modeling system. In some embodiments, the extruder may include one or more openings. In some embodiments, the feedstock may comprise a continuous carbon fiber or other continuous fiber reinforced composite.

In yet another embodiment, the cutting mechanism comprises one or more blade structures, each blade structure including at least one cavity. The cutting mechanism further comprises at least one rod coupled to at least one blade structure such that the blade structure may rotate around an axis of the rod. The motion of one or more blade structures causes the one or more blade structures to intersect with the feedstock pass through zone and cut a feedstock. In some embodiments, the cutting mechanism comprises a first blade structure coupled to a first rod. The first rod may be arranged opposite to a second rod coupled to a second blade structure. In other embodiments, the cutting mechanism may include one or more sharpened edges outlining each cavity. In other embodiments, the one or more cavities may be substantially V-shaped with respect to one direction. In further embodiments, at least one rod may be canted from the feedstock pass through zone such that one or more blade structures rotates around an axis set at an angle to the feedstock pass through zone. In another embodiment, the cutting device may further comprise one or more motors coupled to the one or more blade structures and the one or more motors causes the one or more blade structures to rotate. In some embodiments, each movement of at least one blade structure may begin and end with the at least one blade structure in a position away from at least one opening of an extruder in a fused deposition modeling system. In some embodiments, the extruder may include one or more openings. In some embodiments, the feedstock may comprise a continuous carbon fiber or other continuous fiber reinforced composite.

In yet another embodiment, a method of cutting fiber reinforced feedstock is provided which comprises passing a feedstock through a feedstock pass through zone of a cutting device. The cutting device includes a cutting mechanism and at least a partial perimeter of the feedstock pass through zone is defined by a portion of the cutting mechanism. The method further comprises moving the cutting mechanism such that the cutting mechanism cuts the feedstock. In some embodiments, the cutting mechanism comprises a ribbon including one or more perforations. Passing the feedstock through the feedstock pass through zone includes passing the feedstock through at least one perforation. In such embodiment, moving the cutting mechanism includes advancing the ribbon in one or more directions. In some embodiments, the cutting mechanism may comprise one or more sharpened edges outlining each perforation. In further embodiments, the one or more perforations may be substantially teardrop shaped with respect to one direction. In other embodiments, the one or more perforations may be symmetrically shaped. In certain embodiments, moving the cutting mechanism may further include rotating a set of reels coupled to the ribbon such that the ribbon is advanced in one or more directions. In other embodiments, the ribbon may be advanced through at least one guide and remains within a predetermined space defined by the at least one guide. In a further embodiment, one or more motors may be coupled to the set of reels and may cause at least one reel to rotate. In some embodiments, the method may further comprise substantially aligning at least one perforation with at least one opening of an extruder in a fused deposition modeling system after each advance of the ribbon. In some embodiments, the feedstock may comprise a continuous carbon fiber or other continuous fiber reinforced composite.

In yet another embodiment, a system of cutting fiber reinforced feedstock is provided which comprises a source of a feedstock and an extruder configured to extrude the feedstock from one or more openings. In some embodiments, the extruder may include one or more openings. The system may further comprise a cutting device including a cutting mechanism. A portion of the cutting mechanism defines at least a partial perimeter of the feedstock pass through zone. In some embodiments, the cutting mechanism may comprise a ribbon including one or more perforations. The feedstock is passed through at least one perforation of the ribbon. The cutting device may further comprise a set of reels coupled to the ribbon, and rotating the reels causes movement of the ribbon in one or more directions. The cutting device may further comprise one or more motors coupled to the set of reels, and the one or more motors causes at least one reel to rotate. The movement of the ribbon cuts the material and each movement causes at least one perforation of the one or more perforations to substantially align with at least one opening of the one or more openings of the extruder. In some embodiments, the feedstock may comprise a continuous carbon fiber or other continuous fiber reinforced composite.

BRIEF DESCRIPTION OF THE DRAWINGS

The disclosure may best be understood by reference to the following description taken in conjunction with the accompanying drawings, which illustrate particular embodiments of the present disclosure.

FIG. 8B illustrates an alternate view of the example of a cutting device using a disk as shown in FIG. 8A.

DESCRIPTION OF PARTICULAR EMBODIMENTS

Figure 1:
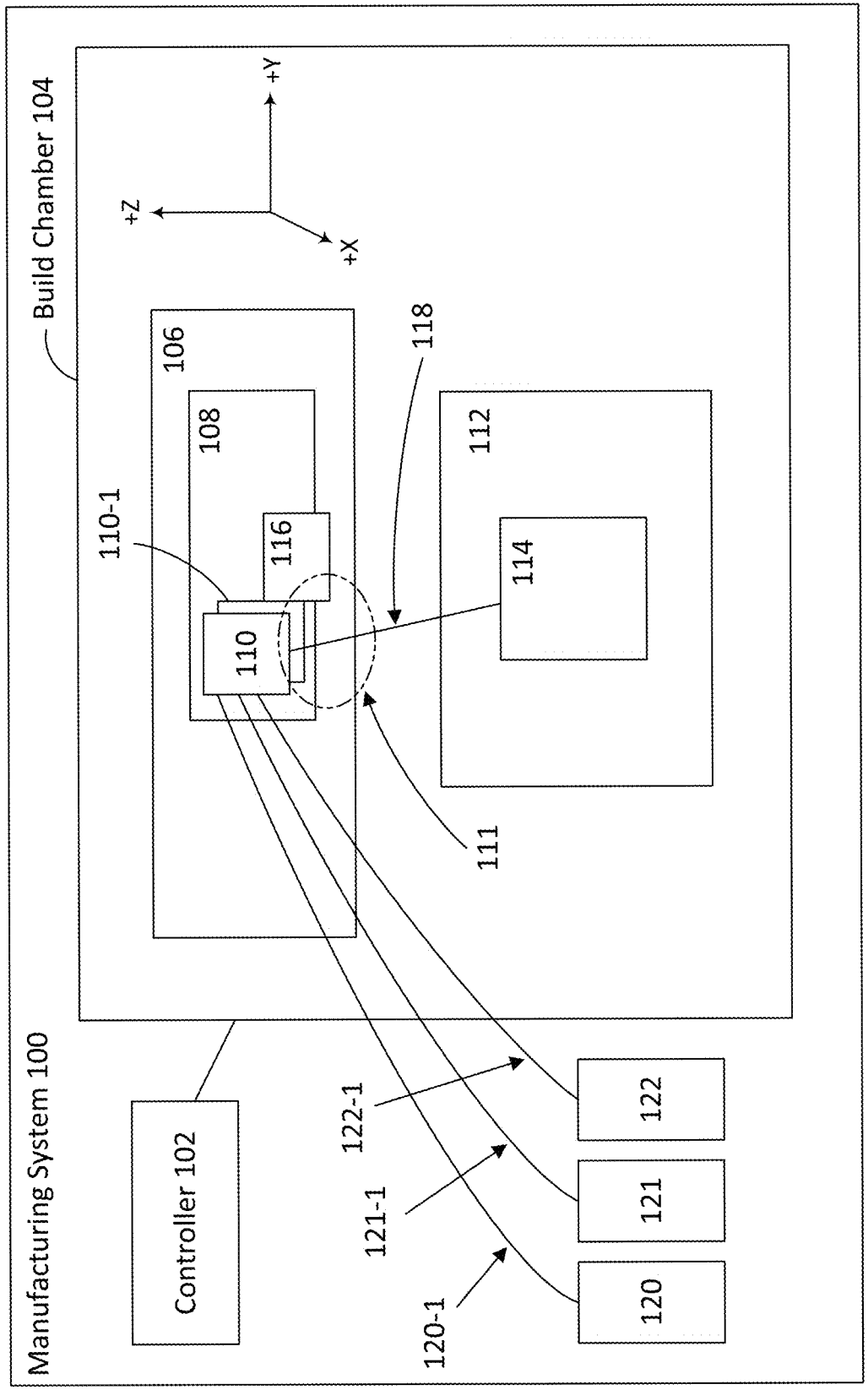
FIG. 1 illustrates an example of a manufacturing system that can be used in conjunction with the techniques and mechanisms of the present disclosure.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the structure and mechanisms of the present disclosure will be described in the context of particular materials. However, it should be noted that the structure and mechanisms of the present disclosure may consist of a variety of different materials. In the following description, numerous specific details are set forth in order to provide a thorough understanding of the present disclosure. Particular example embodiments of the present disclosure may be implemented without some or all of these specific details. In other instances, well known structures, mechanisms, and materials have not been described in detail in order not to unnecessarily obscure the present disclosure.

Definitions

It will be understood that, although the terms "first," "second." etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

As used herein, the terms "feedstock," "filament," and "strand" refer to thinly shaped rods of material of indefinite length with varying cross-sectional shapes and diameters used generally in fused deposition modeling and other 3D printing processes, and all such terms may be used interchangeably throughout the present disclosure.

Various techniques and mechanisms of the present disclosure will sometimes be described in singular form for clarity. However, it should be noted that some embodiments include multiple iterations of a structure or multiple instantiations of a mechanism unless noted otherwise. For example, a system uses a processor in a variety of contexts where components are controlled automatically, electronically, or wirelessly. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, a fiber reinforced feedstock cutting device is provided which comprises a feedstock pass through zone and a cutting mechanism. A portion of the cutting mechanism defines at least a partial perimeter of the feedstock pass through zone. In some embodiments, the cutting mechanism comprises a ribbon including one or more perforations. A feedstock is passed through at least one perforation of the one or more perforations and movement of the ribbon cuts the feedstock. In some embodiments, the cutting mechanism may comprise one or more sharpened edges outlining each perforation. In further embodiments, the one or more perforations may be substantially teardrop shaped with respect to one direction. In other embodiments, the one or more perforations may be symmetrically shaped. In some embodiments, the cutting device may further comprise a set of rotatable reels coupled to the ribbon, and rotating at least one of the reels causes movement of the ribbon in one or more directions. In some embodiments, the cutting device may further comprise one or more motors coupled to at least one reel, and the one or more motors causes at least one reel to rotate. In other embodiments the cutting device may further comprise one or more guides. The ribbon passes through the one or more guides and remains within a predetermined space defined by the one or more guides. In some embodiments, each movement of the ribbon may cause at least one perforation to substantially align with at least one opening of an extruder in a fused deposition modeling system. In some embodiments, the extruder may include one or more openings. In some embodiments, the feedstock may comprise a continuous carbon fiber or other continuous fiber reinforced composite.

According to further embodiments, the cutting mechanism comprises a disk including one or more blade structures. Each blade structure includes at least one cavity. A feedstock is passed through at least one cavity and a rotational movement of the disk cuts the feedstock. In some embodiments, the cutting mechanism may include one or more sharpened edges outlining each cavity. In further embodiments, one or more cavities may be substantially teardrop shaped with respect to one direction. In other embodiments, at least one cavity may comprise at least one fully enclosed perforation with each blade structure. In some embodiments, the cutting device may further comprise one or more motors coupled to the disk, and the one or motors causes the disk to rotate. In other embodiments, each rotational movement of the disk may cause at least one cavity to substantially align with at least one opening of an extruder in a fused deposition modeling system. In some embodiments, the extruder may include one or more openings. In some embodiments, the feedstock may comprise a continuous carbon fiber reinforced composite.

According to further embodiments, the cutting mechanism comprises a guide shaft including a set of rails positioned in parallel. A feedstock is passed between the rails. The cutting device may further comprise a slider coupled to the rails such that the slider may move along a length of the rails from a first position to a second position. The cutting device may further comprise a crank mechanism coupled to the slider, and rotation of the crank mechanism causes the slider to travel the length of the rails and cut the feedstock passed between the rails. The slider may return to the first position after each full rotation of the crank mechanism. In some embodiments, the cutting mechanism may include one or more sharpened edges. In other embodiments, the cutting mechanism may further include an end structure coupled to the guide shaft. In another embodiment, the cutting mechanism may comprise a set of blade structures including the one or more sharpened edges. The blade structures are coupled to the slider, and the end structure is shaped such that the end structure causes the blade structures to come together and cut the feedstock when the slider is at the second position. In other embodiments, the cutting device may further comprise one or more motors coupled to the crank mechanism, and the one or more motors causes the crank to rotate. In some embodiments, the guide shaft may be substantially aligned with at least one opening of an extruder in a fused deposition modeling system. In some embodiments, the extruder may include one or more openings. In some embodiments, the feedstock may comprise a continuous carbon fiber reinforced composite.

According to further embodiments, the cutting mechanism comprises one or more blade structures, each blade structure including at least one cavity. The cutting mechanism further comprises at least one rod coupled to at least one blade structure such that the blade structure may rotate around an axis of the rod. The motion of one or more blade structures causes the one or more blade structures to intersect with the feedstock pass through zone and cut a feedstock. In some embodiments, the cutting mechanism comprises a first blade structure coupled to a first rod. The first rod may be arranged opposite to a second rod coupled to a second blade structure. In other embodiments, the cutting mechanism may include one or more sharpened edges outlining each cavity. In other embodiments, the one or more cavities may be substantially V-shaped with respect to one direction. In further embodiments, at least one rod may be canted from the feedstock pass through zone such that one or more blade structures rotates around an axis set at an angle to the feedstock pass through zone. In another embodiment, the cutting device may further comprise one or more motors coupled to the one or more blade structures and the one or more motors causes the one or more blade structures to rotate. In some embodiments, each movement of at least one blade structure may begin and end with the at least one blade structure in a position away from at least one opening of an extruder in a fused deposition modeling system. In some embodiments, the extruder may include one or more openings. In some embodiments, the feedstock may comprise a continuous carbon fiber reinforced composite.

DETAILED DESCRIPTION

Thermoplastic and other non-metallic additives typically used as feedstock in fused deposition modeling systems do not require cutting to separate extruded strands of the material from the extruder. Such thermoplastic material may be separated by movement of the extruder away from the extruded strands. Such non-metallic additive manufacturing technologies produce unique and complex items, but with limited mechanical properties and a high coefficient of thermal expansion. Thus, property improvements are necessary to more broadly transition technology for flight hardware from functional prototypes to tooling and end use parts.

One area of particular interest for composite materials in general and for composite parts formed using additive manufacturing in particular is using continuous fibers. Continuous fibers provide high strength levels in the direction of the fiber. For example, a composite feedstock strip formed from a polyaryletherketone (PAEK) resin and filled with 30% by volume of chopped carbon fibers may have a tensile modulus of about 3 million pounds per square inch (MSI). At the same time, a composite feedstock strip formed from the same resin and filled with 35% by volume of continuous carbon fibers may have a tensile modulus of greater than 10 MSI. Furthermore, composite parts produced using continuous fiber feedstock are expected to have roughly five times the strength and ten times the stiffness of comparable unreinforced parts currently produced. Because of their increased strength and other properties, such continuous fiber reinforcements, may require additional cutting after heating and extrusion to separate the material from the extruder.

According to various embodiments, a cutting device may comprise a thin, flat ribbon structure with multiple perforations. In some embodiments, the perforations may be lined centrally and run along the length of the ribbon structure. In some embodiments, the perforations are spaced evenly apart from each other. In some embodiments, material is passed through one or more perforations and movement of the ribbon severs the material. For example, the material may be continuous fiber or other continuous fiber reinforced feedstock used in fused deposition modeling and/or manufacturing. Such material may be a continuous carbon reinforced composite made by continuous compression molding and slit into feedstock of a desired cross-sectional shape. The material may be extruded through the opening of an extruder aligned with the perforation and may be passed through a perforation of the ribbon. In some embodiments, the material may be extruded through multiple openings of an extruder. The ribbon may be moved in a predetermined direction so that the edges of the perforation make contact with the extruded material. As the ribbon continues movement in the predetermined direction, the edges of the perforation may slice through the material until the material is completely severed. In some embodiments, the ribbon may continue movement in the predetermined direction until a subsequent perforation is aligned with the opening of the extruder.

In some embodiments, the perforations may include sharpened edges to further enable the edges to slice through the material. In other embodiments, the perforations may be "teardrop" shaped with a wider round portion that tapers toward a sharpened point. Material may be extruded and passed through the wider round portion, and as the ribbon moves in the predetermined direction, the tapered point presses against the material to allow for a concentrated cut force for the cutting load of the continuous fiber extrudate. In other embodiments, the perforations may comprise other shapes such as a triangular, diamond, circular, etc. In further embodiments, the perforations may be symmetrically shaped to allow for cutting by movement of the ribbon in at least two directions.

In certain embodiments, the ribbon may be moved by rotating a set of reels. In some embodiments, the ribbon may be wound around the set of reels, and movement of the ribbon is caused by rotating the reels such that the ribbon is passed from a first reel to a second reel. In other embodiments, each reel shaft may be secured to a reel and cause the rotation. In some embodiments, the ribbon may be coupled to more than two reels. In some embodiments, the reels may contain one or more protrusions to form a sprocket structure. In these embodiments, the protrusions may be shaped and arranged such that the protrusions align with the perforations to grip the ribbon and lock the lowest layers of the ribbon on each reel in place. In other embodiments, the protrusions may align with and grip additional perforations in the ribbon. Other means of coupling the ribbon to the reels may be used such as by adhesive, soldering, mechanical attachment, etc.

In other embodiments, a motor may be coupled to each reel and cause the rotation of the reels to wind the ribbon. In some embodiments, a motor may be coupled to a reel by a reel shaft which is rotated by the motor. In other embodiments, a motor may be coupled to each reel shaft by a right angle gear drive or other gear arrangement. Various motors may be implemented in different embodiments, such as a DC motor, a servo motor, a stepper motor, etc.

In further embodiments, the cutting device may include a guide which keeps the ribbon's movement contained in a defined space. In some embodiments, the guide may include rails arranged at a distance such that the rails stabilize the ribbon and allow the ribbon to pass through. In some embodiments, the rails formed by the guide may facilitate alignment of one or more perforations with a source of the material, so that the material may be passed through the one or more perforations. For example, the center of the guide may include an opening where the opening of an extruder may be positioned such that the ribbon's position is forced to pass by the opening of the extruder as it moves through the rails of the guide. In some embodiments, the opening of the extruder may be flush with the opening of the guide so that a cut made by the ribbon cuts the material flush with the opening. In other embodiments, the opening of the extruder may protrude through the guide.

In other embodiments, the perforations may further be aligned by each subsequent movement of the ribbon. For example, the guide may keep a perforation of a ribbon aligned with the opening of an extruder such that the molten material may be passed through the perforation. The ribbon may then be moved to cut the material as previously described above. As the movement severs the material, a subsequent perforation in the ribbon is moved toward the opening of the extruder and movement of the ribbon is stopped when the subsequent perforation is substantially aligned with the opening of the extruder so that material may be passed through the subsequent perforation.

In yet further embodiments, a cutting device may comprise a thin disk structure. The thin disk structure may include one or more blade structures around the circumference of the disk. Each blade structure may form at least one cavity with sharpened edges outlining each cavity. In some embodiments, material is passed through one or more cavities and rotation of the disk causes the sharpened edges of the blade structures to slice through and cut material within a cavity. For example, the material may be continuous carbon fiber reinforced composite used in fused deposition modeling and/or manufacturing. The material may be extruded through one or more openings of an extruder aligned with at least one cavity and may be passed through the each cavity substantially perpendicular to the plane of the disk. In some embodiments, the material may be extruded through multiple openings of an extruder and passed through multiple cavities in the disk. In some embodiments, the cavities may be fully enclosed by the blade structure so that the cavities comprise perforations within each blade structure. In other embodiments, each blade structure may contain multiple cavities and/or perforations. In other embodiments, each blade structure may be symmetrically shaped.

Rotation of the disk may be driven by a drive mechanism that is directed by a controller. Such a drive mechanism may comprise a motor arrangement including a DC motor, servo motor, and/or stepper motor. In some embodiments, the drive mechanism may further comprise a transmission and gear arrangement. The rotation of the disk may continue until one or more subsequent cavities are substantially aligned with one or more openings of the extruder so that additional material may be passed through the one or more openings.

In yet further embodiments, a cutting device may comprise a slider-crank mechanism including a guide shaft comprising a set of rails positioned in parallel. In some embodiments, material may be passed between the rails. For example, the material may be a continuous carbon fiber reinforced composite used in fused deposition modeling and/or manufacturing. The material may be extruded through one or more openings of an extruder aligned with the rails.

In some embodiments, a slider is coupled to the set of rails such that the slider may move along a length of the rails from a first position to a second position. In some embodiments, a crank mechanism may be coupled to the slider by a connecting rod such that rotation of the crank mechanism causes the connecting rod to push the slider along the length of the rails from the first position to the second position and cut the material between the rails. The slider returns to the first position after each full rotation of the crank mechanism.

In some embodiments, the slider may include one or more sharpened edges to cut the material. In other embodiments, the slider may include one or more blade structures. In other embodiments, the rails may be coupled to an end structure of the guide shaft such that material is cut by the force of the one or more sharpened edges against the end structure. In some embodiments, the end structure may also include a sharpened edge. In other embodiments, the end structure may include a guide to control movement of one or more blade structures coupled to the slider. In further embodiments, the slider may be coupled to a set of blade structures with sharpened edges coupled together at a pivot point on the slider such that the blades may open and close. The set of blades remain open when the slider is in the first position. The end structure is further shaped such that as the slider is pushed along the length of the rails toward the second position, the end structure forces the blades together to cut the material between the rails. As the slider returns to the first position, the blades open.

In some embodiments, rotation of the crank mechanism may be driven by a drive mechanism that is directed by a controller with memory and a processor. Such a drive mechanism may comprise a motor arrangement including a DC motor, servo motor, and/or stepper motor. In some embodiments, the drive mechanism may further comprise a transmission and gear arrangement. In other embodiments, the drive mechanism may comprise a pneumatic cylinder (not shown) connected directly to the slider. In some embodiments, the crank mechanism may stop rotating after each full rotation and begin another rotation when another cut is to be made. In other embodiments, the crank mechanism may make multiple full rotations for multiple cuts.

In yet further embodiments, a cutting device may comprise a swiveling blade structure. In some embodiments, the blade structure may be coupled to a pivoting rod such that the blade structure may swivel around an axis of the pivoting rod. In other embodiments, the blade structure may rotate around the axis in a full circle. In some embodiments, the blade structure may include a cavity. In other embodiments, the blade structure may include a plurality of cavities. In some embodiments, the rotation of the blade structure around the axis of the pivoting rod causes the blade structure to intersect an extruded material and slice through and cut material. For example, the material may be a continuous carbon fiber reinforced composite used in fused deposition modeling and/or manufacturing. The material may be extruded through one or more openings of an extruder. The pivoting rod and the blade structure may be arranged such that at one point in the rotation of the blade structure, the cavity substantially aligns with the extruded material and the rotational force causes the blade structure to slice through the extruded material at the cavity. The rotational motion of the blade structure may continue until the blade structure has completely passed through and severed the material.

In some embodiments, the cavity may include sharpened edges outlining the cavity to further enable the blade structure to slice through the material. In other embodiments, the cavity may be substantially V-shaped with a wider portion that tapers toward a sharpened point such that the extruded material enters the cavity at a wider portion. As the blade structure moves toward the material, the tapered point presses against the material to allow for a concentrated cut force for the cutting load of the material. In other embodiments, the perforations may comprise other shapes such as a triangular, diamond, circular, etc.

In some embodiments, the cutting device may include a plurality of pivot rods coupled to one or more blade structure. For example, the cutting device may comprise two pivot rods with a blade structure coupled to each pivot rod. In some embodiments, each pivot rod is arranged opposite to the other in a symmetrical arrangement. The blade structures rotate along the axis of its respective pivot rod in the same direction (clockwise or counterclockwise) such that the blade structures make contact with the extruded material simultaneously from opposite directions. In some embodiments the blade structures may rotate in opposite directions. In other embodiments, the blade structures may not rotate simultaneously or may not make contact with the extruded material simultaneously.

In some embodiments, rotation of the blade structures may be driven by a drive mechanism that is directed by a controller with memory and a processor. Such a drive mechanism may comprise a motor arrangement including a DC motor, servo motor, and/or stepper motor. In some embodiments, the drive mechanism may further comprise a transmission and gear arrangement. In some embodiments, the blade structures may stop rotating after each full rotation and begin another rotation when another cut is to be made. In some embodiments, the rotation of the blade structures may begin and end with the blade structures at a position away from the extruder to limit obstruction of the extruder. In another embodiment, the pivot rods may be canted at an angle in relation to the extruder such that the blade structures are furthered position away from the extruder at the beginning and end of each rotation around the pivot rods.

Example Embodiments

FIG. 1 illustrates an example of a manufacturing system that can be used in conjunction with the various techniques and embodiments of the present disclosure. According to various embodiments, manufacturing system 100 may include controller 102, build chamber 104, robotic mechanism 106, extruder 108, opening 110, opening 110-1, feedstock pass through zone 111, moveable table 112, object 114, cutting device 116, extruded material 118, material source 120, material feedstock 120-1, material source 121, material feedstock 121-1, material source 122, and material feedstock 122-1. In accordance with various embodiments, manufacturing system 100 may be a fused deposition modeling system configured to build a three dimensional object depicted as object 114. In some embodiments, controller 102 may be a computer system with memory and one or more processors configured to control various manufacturing processes including, but not limited to material input, robotic arm movement, extruder movement, moveable table positioning, and other processes involved in fused deposition modeling. For example, controller 102 may be a computer-aided design (CAD) controller and/or a computer-aided manufacturing (CAM) controller that directs the building of object 114 based on a mathematical model of object 114. In some embodiments, the mathematical model of object 114 may be created with controller 102 or may be created elsewhere and imported into controller 102. In other embodiments, controller 102 may include a list of the desired structural properties of object 114.

Controller 102 may further include a list of the properties of material feedstocks 120-1, 121-1, and 122-1. Material feedstocks 120-1, 121-1, and 122-1 may consist of thermoplastic material comprising milled fiber, chopped fiber, continuous fiber strands, or any combination thereof. In other embodiments, material feedstocks 120-1, 121-1, and 122-1 may consists of other types of thermoplastic or metal material, including but not limited to continuous carbon fiber reinforced composite formed by continuous compression molding and slit into feedstock of a desired cross-sectional shape. In some embodiments, controller 102 may generate a design for object 114 that includes the location and/or geometry of the material feedstocks 120-1, 121-1, and 122-1 in object 114.

Build chamber 104 may be an enclosed environment in which object 114 is built. In some embodiments, build chamber 104 may include moveable table 112 which comprises a platform (not shown) on which object 114 is built. In some embodiments, moveable table 112 may be configured to rotate the platform (not shown). In some embodiments, moveable table 112 may be driven by a drive mechanism that is directed by controller 102, and may include a motor arrangement such as a stepper motor (not shown) and/or servo motor (not shown) coupled to a transmission (not shown) or gear arrangement (not shown) for controlled transmission of rotational movement of the motor(s) (not shown) to the moveable table 112. In some embodiments, moveable table 112 may be configured to rotate the platform (not shown) in clockwise and counterclockwise directions around the Z axis under the direction of controller 102. In other embodiments, moveable table 112 may be configured to raise and lower the platform (not shown) in the +Z and the −Z directions under the direction of controller 102. In further embodiments, moveable table 112 may be configured to move the platform (not shown) in the +X direction, the −X direction, the +Y direction, the −Y direction, or any combination thereof.

In various embodiments, manufacturing system 100 may further include one or more robotic mechanisms 106. Robotic mechanisms 106 may be configured to place opening 110 of extruder 108 at any location in the build volume of object 114, from various approach angles. In some embodiments, robotic mechanism 106 may be powered by mechanisms such as electric motors, hydraulic actuators, or combinations thereof, and configured to provide three or more axes or degrees of freedom. Other embodiments may include any other suitable positioning assembly capable of placing opening 110 at a desired location in the build volume of object 114. Such positioning assemblies may include, but are not limited to, an X-Y-Z rectilinear mechanism, or a delta robot mechanism.

In some embodiments extruder 108 may be configured to melt the material feedstocks 120-1, 121-1, and 122-1 and extrude the molten extruded material 118 via opening 110 through feedstock pass through zone 111. In various embodiments, extruder 108 may include one opening 110 or multiple openings, such as opening 110 and opening 110-1.

In some embodiments, feedstock pass through zone 111 may comprise a volume of space that may encompass portions of extruder 108, opening 110, and cutting device 116. In some embodiments, at least a partial perimeter of feedstock pass through zone 111 is defined by a portion of a cutting mechanism of cutting device 116. In various embodiments extruder 108 may define an interior chamber for receiving the thermoplastic material. In some embodiments, extruder 108 may include a liquefier or heating element for melting the material feedstocks 120-1, 121-1, and 122-1 within the chamber for extrusion through opening 110 and through feedstock pass through zone 111 in liquid and/or molten form as extruded material 118. In other embodiments, extruder 108 may include a motor (not shown) or any other suitable mechanism for pushing the material (not shown) through the chamber (not shown) and out opening 110. In some embodiments, opening 110 may include a needle (not shown) comprising a hollow tube or nozzle (not shown) having a first open end (not shown) that communicates with the chamber (not shown) of the extruder 108 and a second open end (not shown) that dispenses the molten extruded material 118. The dispensing end (not shown) of opening 110 may be circular, oval, square, slotted or any other suitable shape that is capable of extruding the molten extruded material 118 in a desired cross-sectional shape. According to various embodiments, one or more motors may be used for feeding the material feedstocks 120-1, 121-1, and 122-1 into the extruder 108 from material strand spools 120, 121, and 122. Controller 102 may control the rate of the one or more motors, the temperature of the heating element, and/or other process parameters previously described so that the material can be extruded in a manner that satisfies the desired structural properties of object 114.

According to various embodiments, extruder 108 may also be configured with a cutting device 116 to cut extruded material 118 to the appropriate length after liquefaction and extrusion. In some embodiments, the cutting device may include a blade (not shown) or other suitable cutting mechanism (not shown) for cutting the one or more strands of extruded material 118. In various embodiments, a portion of this cutting mechanism may define at least partial perimeter of feedstock pass through zone 111. In some embodiments, the cutting device 116 may include a cutting mechanism that comprises a ribbon 302 as described in FIGS. 2, 3, 4, 5, and 6. As will be described in FIG. 3 a ribbon 302 may be coupled to a set of reels 306 and 307 such that material is extruded and passed through one or more perforations such as perforations 304-1, 304-2, and 304-3, of the ribbon 302, and movement of the ribbon 302 severs extruded material 118 at the desired length. In other embodiments, cutting device 116 may include a cutting mechanism that comprises a disk 802 as described in FIGS. 8A and 8B. As will be described in FIG. 8B, disk 802 includes one or more blade structures 804 shaped such that each blade structure forms a cavity 806-1 that aligns with opening 110 such that extruded material 118 is extruded through a cavity 806-1. Disk 802 may be rotated by one or more motors 808 such that blade structures 804 sever extruded material 118 at the desired length. In a further embodiment, cutting device 116 may include a cutting mechanism as described in FIGS. 10A, 10B, and 10C. As will be described in FIGS. 10A, 10B, and 10C, the cutting mechanism may include crank mechanism 1002 coupled to guide shaft 1006, slider 1008, connecting rod 1004, and one or more motors 1012. The guide shaft 1006 may comprise a set of parallel rails 1006-1 positioned around opening 110. The slider 1008 may include one or more sharpened blade structures 1009, and positioned to move along a length of the parallel rails 1006-1 of guide shaft 1006. As the one or more motors 1012 cause the crank mechanism 1002 to rotate, the connecting rod 1004 may engage the slider 1008 to move along a length of the guide shaft 1006 and cut the extruded material 118. In yet another embodiment, cutting device 116 may include a cutting mechanism that comprises one or more rotatable blade structures 1206 and 1208 as described in FIGS. 12A, 12B, and 12C. As will be described in FIGS. 12A, 12B, and 12C, blade structures 1206 and 1208 are coupled to at least one rod 1202 and rotation of blade structures 1206 and 1208 around an axis Y-1 of rod 1202 causes blade structures 1206 and 1208 to intersect and cut extruded material 118 during each rotation.

In some embodiments, material feedstocks 120-1, 121-1, and 122-1 may be cut "upstream" prior to being fed into extruder 108 for heating. However, difficulties and inefficiencies may arise with upstream cutting. For example, there may be difficulty in predicting the amount of material required for a build sequence. Furthermore, an upstream cutting process would require reloading of the material feedstocks 120-1, 121-1, and 122-1 to feed into the extruder 108 after each cut, which may eliminate an immediate stop/start process and result in loss of calibration with build object 114. Thus, it would be more desirable to print in circuits and limit the number of cuts required in a system with upstream cutting. However, limiting the number of upstream cuts results in a loss of responsiveness and build variety.

Instead, "downstream" cutting of extruded material 118 occurs at feedstock pass through zone 111, after material feedstocks 120-1, 121-1, and 122-1 are melted and extruded from extruder 108. Downstream cutting of extruded material 118 may be more desirable because it allows for an immediate stop/start process in real-time which maintains calibration with build object 114, allows for a larger variety of components and/or parts to be built, and results in fewer configuration limitations. However, a downstream cutting mechanism may face potential problems with clearance and obstruction with build object 114.

According to various embodiments, techniques and mechanisms are described herein with respect to cutting material in fused deposition modeling (FDM) manufacturing processes. However, the techniques and mechanisms described are applicable to cutting any type of material in various manufacturing processes. Furthermore, the techniques and mechanisms described are also applicable to a wide variety of other contexts. For instance, the techniques and mechanisms described herein are applicable to any area in which it is desired to quickly and/or automatically cut material where space is limited.

Figure 2:
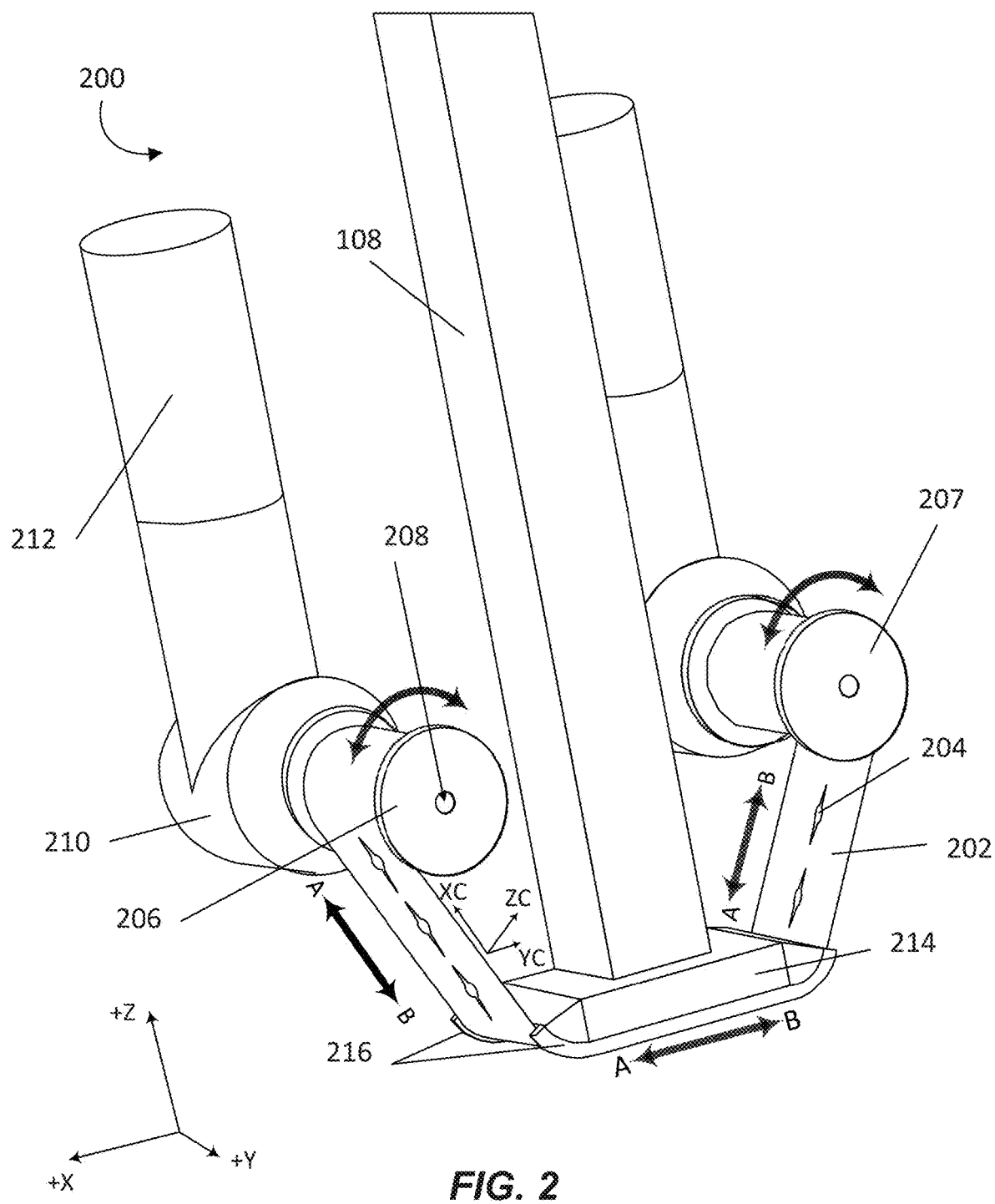
FIG. 2 illustrates one example of a cutting device using a ribbon, in accordance with one or more embodiments.

FIG. 2 is an illustration of an example of a cutting device using a ribbon, in accordance with one or more embodiments. According to various embodiments, cutting device 200 includes ribbon 202, perforations 204, left reel 206, right reel 207, reel shafts 208, gear drives 210, motors 212, guide 214, and rails 216. In some embodiments, cutting device 200 may be coupled to an extruder 108, as described in FIG. 1.

According to various embodiments, ribbon 202 may comprise a thin structure which may lie flat on an X-Y plane relative to ribbon 202. As shown in FIG. 2, the length of ribbon 202 runs in the direction of the relative X axis (marked as XC in FIG. 2) and the width of ribbon 202 runs in the direction of the relative Y axis (marked as YC in FIG. 2). As a substantially flat structure, ribbon 202 may have a negligible thickness in the direction of the relative Z axis (marked as ZC in FIG. 2). In other embodiments, the thickness of ribbon 202 may be more than negligible but not enough to significantly impinge upon the build space. In some embodiments, ribbon 202 may comprise one or more perforations 204 lined successively along the center length of ribbon 202 in the relative X axis. In some embodiments, the perforations are spaced evenly apart. In other embodiments, perforations 204 may be organized in various arrangements on ribbon 202. In some embodiments, ribbon 202 may comprise any material or combination of materials that provides the desired strength, flexibility, durability, hardness, weight, water resistance, ability to be shaped into a feedstock cutter, or other desired physical characteristic.

In certain embodiments ribbon 202 may be coupled to left reel 206 and right reel 207 by being wound around each reel. In some embodiments, left reel 206 and right reel 207 may include one or more protrusions (not shown), such as sprockets and/or claws, arranged such that the protrusions align (not shown) with perforations 204. In other embodiments, the protrusions (not shown) may align with other edge perforations (not shown) along the edge (not shown) of ribbon 202, as further described in FIG. 6. The protrusions grip ribbon 202 by passing through the perforations to lock in place the lowest layer(s) of the wound ribbon on each reel. In some embodiments, the protrusions may align with perforations 204 and grip ribbon 202 by passing through one or more perforations 204. In other embodiments, ribbon 202 may be coupled to reels 206 and 207 by adhesive, soldering, mechanical attachment, etc. In some embodiments, each reel 206 and 207 is coupled to a reel shaft 208 upon which each reel 206 and 207 may rotate. In other embodiments, each reel 206 and 207 is coupled to a reel shaft 208 such that each reel shaft 208 rotates each reel.

According to various embodiments, at least one reel 206 or 207 may be coupled to a motor arrangement comprising motor 212 and a gear drive 210 for rotational movement of reels 206 and 207. In some embodiments, motor 212 may comprise a DC motor, stepper motor, and/or servo motor. In some embodiments, gear drive 210 may comprise a right angle gear drive. In other embodiments, each reel 206 and 207 may be coupled to a motor arrangement including motor 212 and gear drive 210. In some embodiments, reels 206 and 207 may be rotated clockwise, counterclockwise, or any combination thereof to move ribbon 202 in a direction in the relative X axis of ribbon 202 as ribbon 202 is passed from one reel to the other reel. As shown in FIG. 2, clockwise rotation of reels 206 and 207 will result in movement of ribbon 202 in direction A, and counterclockwise rotation of reels 206 and 207 will result in movement of ribbon 202 in direction B.

In various embodiments, cutting device 200 may include guide 214 to keep ribbon 202 contained in a defined space as ribbon 202 is moved along reels 206 and 207. In some embodiments, guide 214 may include a pair of parallel rail structures 216 arranged at a distance such that the rails 216 stabilize ribbon 202 and allow ribbon 202 to pass through without shifting in the +Y or −Y directions. In some embodiments rails 216 formed by guide 214 may facilitate alignment of one or more perforations 204 with an opening of extruder 108, as further described in FIG. 3.

According to various embodiments, at least one perforation 204 is aligned with an opening of extruder 108, such as opening 110, and may define at least a partial perimeter of feedstock pass through zone 111, as described in FIG. 1. In certain embodiments, material, such as material feedstocks 120-1, 121-1, and/or 122-1, is extruded from extruder 108 and through opening 110 and passed through one or more perforations 204 aligned with opening 108 in a direction substantially in the Z axis of ribbon 202 and substantially perpendicular to the relative X-Y plane of ribbon 202. In certain embodiments, as ribbon 202 is moved along reels 206 and 207, the edges of perforation 204 slice through the material until the material is completely severed, as further described in FIG. 3. In some embodiments, perforations 204 may include sharpened edges to sever the material. In further embodiments, the perforations may be "teardrop" shaped with a relatively wider center portion that is rounded and tapers toward a sharpened point at the relative +X and −X ends, as further described in FIG. 3. As ribbon 202 moves along reels 206 and 207, the tapered point of such teardrop shaped perforation 204 presses against the material to allow for a concentrated cut force for the cutting load of the material. In other embodiments, perforations 204 may comprise other geometric shapes such as triangles, diamonds, circles, ovals, etc. In further embodiments, the perforations may be symmetrically shaped to allow for cutting by movement of the ribbon in a reverse direction in the X axis of the ribbon.

Figure 3:
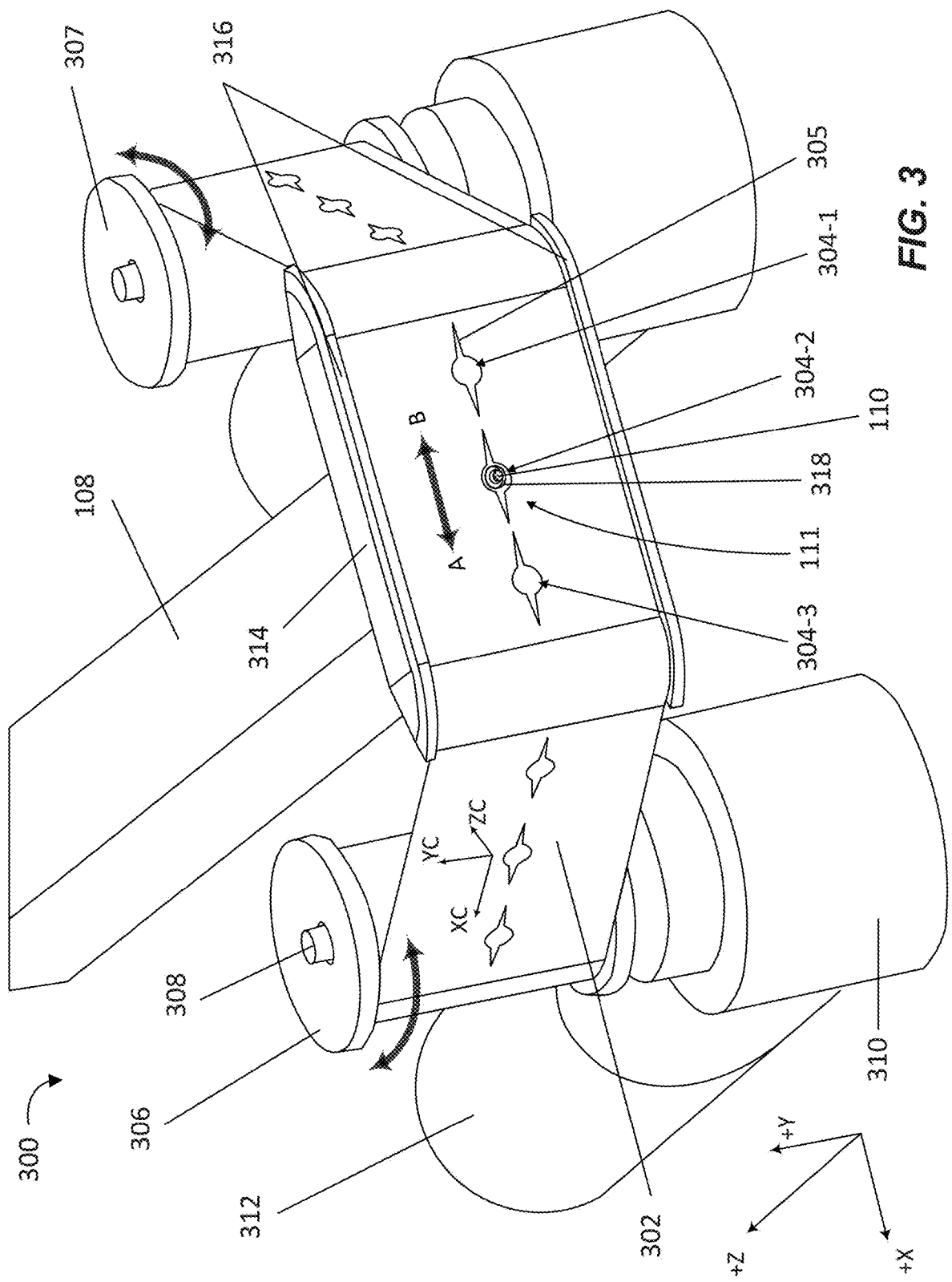
FIG. 3 illustrates an alternate view of the example of a cutting device using a ribbon as illustrated in FIG. 2.

FIG. 3 illustrates an alternate view of the example of a cutting device using a ribbon as illustrated in FIG. 2, in accordance with one or more embodiments. According to various embodiments, cutting device 300 includes ribbon 302, left reel 306, right reel 307, reel shaft 308, gear drive 310, motor 312, guide 314, rails 316, and guide aperture 318. Cutting device 300 also includes perforations 304, including perforation 304-1, perforation 304-2, perforation 304-3. In some embodiments, perforations 304 may include one or more sharpened edges 305. In some embodiments, cutting device 300 may be coupled to an extruder 108 with opening 110, as described in FIG. 1.

In certain embodiments, material may be extruded through perforations 304 that are substantially aligned with opening 110 of extruder 108. As shown in FIG. 3, perforation 304-2 is substantially aligned with opening 110 and defines at least a partial perimeter of feedstock pass through zone 111. In some embodiments, guide 314 may also contain a guide aperture 318 through which extruder 108 may extrude material (not shown) through. In some embodiments, a nozzle or needle of opening 110 may lie flush with the guide aperture 318. In other embodiments, a nozzle or needle of opening 110 may protrude through the guide aperture 318. In certain embodiments, the parallel rails 316 of guide 314 may stabilize ribbon 302 and allow ribbon 302 to pass through such that guide 314 restricts the movement of ribbon 302 in the direction of the YC axis, which is the relative Y axis of ribbon 302, to the space defined by rails 316. By controlling the movement of ribbon 302 in the direction of the relative Y axis of ribbon 302, guide 316 ensures alignment of one or more perforations 304 with opening 110 along the relative Y axis of ribbon 302. Alignment of the perforations 304-1, 304-2, and 304-3 with opening 110 along the relative X axis of ribbon 302 is managed through movement of ribbon in the directions A and/or B. This movement may be driven by one or more drive mechanisms including motor 312 and gear drive 310, and may be directed by a controller, such as controller 102 as described in FIG. 1.

In various embodiments, reels 306 and 307 are positioned away from opening 110 to eliminate obstruction with the build object such as object 114, as described in FIG. 1. In some embodiments, guide 314 brings ribbon 302 to an extended position flush with a nozzle of opening 110. In some embodiments, guide 314 may retract to allow a nozzle of opening 110 to protrude through both the guide aperture 318 and perforation 304-2 while extruding the material through feedstock pass through zone 111. At the desired length, guide 314 may extend back to bring ribbon 302 back to the extended position flush with the nozzle of opening 110 before ribbon 302 is moved to cause perforation 304-2 to cut the material flush with the nozzle of opening 110. Various mechanisms may be used to retract and extend guide 314, such as a motor mechanism including a servo motor (not shown) and/or a stepper motor (not shown). In another embodiment, a dual direction pneumatic air cylinder mechanism (not shown) may retract and extend guide 314. In other embodiments, cutting device 300 may be rotatable around extruder 108 to eliminate and/or reduce obstruction with build object such as object 114. Such rotation of guide 314 around extruder 108 may be caused by various motor mechanisms (not shown) including a servo motor and/or a stepper motor.

As shown in FIG. 3, perforations 304-1, 304-2, and 304-3 may be symmetrical and teardrop shaped including a relatively wider center portion that is rounded and tapers toward a sharpened point on the relative X axis ends. In some embodiments, the relatively wider center portion may be large enough for a nozzle of opening 110 to protrude through. Perforation 304-2 is substantially aligned with opening 110. As previously described, molten material may be extruded from opening 110 and passed through perforation 304-2 in a direction substantially in the relative Z axis of ribbon 302 and substantially perpendicular to the relative X-Y plane of ribbon 202. In some embodiments, material may continue to be extruded until at a desired length, at which point, movement of ribbon 302 in directions A or B causes the extruded material to be cut as tapered edges of perforation 304-2 presses against the material. The tapered shape of the edges of perforation 304-2 allow for a more concentrated cut force. In some embodiments, the perforations may include sharpened edges to promote cutting of the material.

For example in FIG. 3, at the desired length, a controller, such as controller 102 as described in FIG. 1, may initiate movement of left reel 306 in a clockwise direction to cause ribbon 302 to move in direction A. In this example, ribbon 302 is passed from right reel 307, which acts as a supply reel, to left reel 306, which acts as a take up reel. In other embodiments, right reel 307 may also rotate clockwise to move ribbon 302 in direction A. In other embodiments, ribbon 302 may be coupled to left reel 306 and right reel 307 such that left reel 306 and right reel 307 must rotate counterclockwise to move ribbon 302 in direction A. In other embodiments, ribbon 302 may be coupled to left reel 306 and right reel 307 such that left reel 306 and right reel 307 must rotate in opposite directions in order to move ribbon 302 in direction A. As ribbon 302 moves in direction A, the edges at the right end of perforation 304-2 presses against the material to allow for a concentrated cut force for the cutting load of the material. Once the material has been completely severed, ribbon 302 continues to move in direction A until subsequent perforation 304-1 is substantially aligned with opening 110 to allow material to be passed through. This process may be repeated until ribbon 302 is substantially unwound from right reel 307. Using a subsequent new perforation 304 after each cut ensures a fresh cut surface with optimal cutting capability for each new cut without loss in performance.

In another embodiment, cutting device 300 may be additionally and/or alternatively configured to cut material by movement of ribbon 302 in direction B once ribbon 302 has substantially unwound from right reel 307. In other embodiments, cutting device 300 may alternate between moving ribbon 302 in direction A and B based on other instructions or parameters. For example in FIG. 3, at the desired length, a controller, such as controller 102 as described in FIG. 1, may initiate movement of right reel 307 in a counterclockwise direction to cause ribbon 302 to move in direction B. In this example, ribbon 302 is passed from left reel 306, which acts as a supply reel, to right reel 307, which acts as a take up reel. In other embodiments, left reel 306 may also rotate counterclockwise to move ribbon 302 in direction B. In other embodiments, ribbon 302 may be coupled to left reel 306 and right reel 307 such that left reel 306 and right reel 307 must rotate clockwise to move ribbon 302 in direction B. In other embodiments, ribbon 302 may be coupled to left reel 306 and right reel 307 such that left reel 306 and right reel 307 must rotate in opposite directions in order to move ribbon 302 in direction B. As ribbon 302 moves in direction B, the edges at the left end of perforation 304-2 press against the material to allow for a concentrated cut force for the cutting load of the material. Once the material has been completely severed, ribbon 302 continues to move in direction B until subsequent perforation 304-3 is substantially aligned with opening 110 to allow material to be passed through. This process may be repeated until ribbon 302 is substantially unwound from left reel 306. By switching the direction of ribbon 302 with symmetrically shaped perforations 304, cutting device 300 doubles the amount of new, unused cut surfaces for each perforation 304. After each edge of a perforation 304 has been utilized for a cut, ribbon 302 may be replaced. However, in some embodiments, a set of sharpened edges in each perforation 304 may be utilized more than once before replacement.

Figure 4:
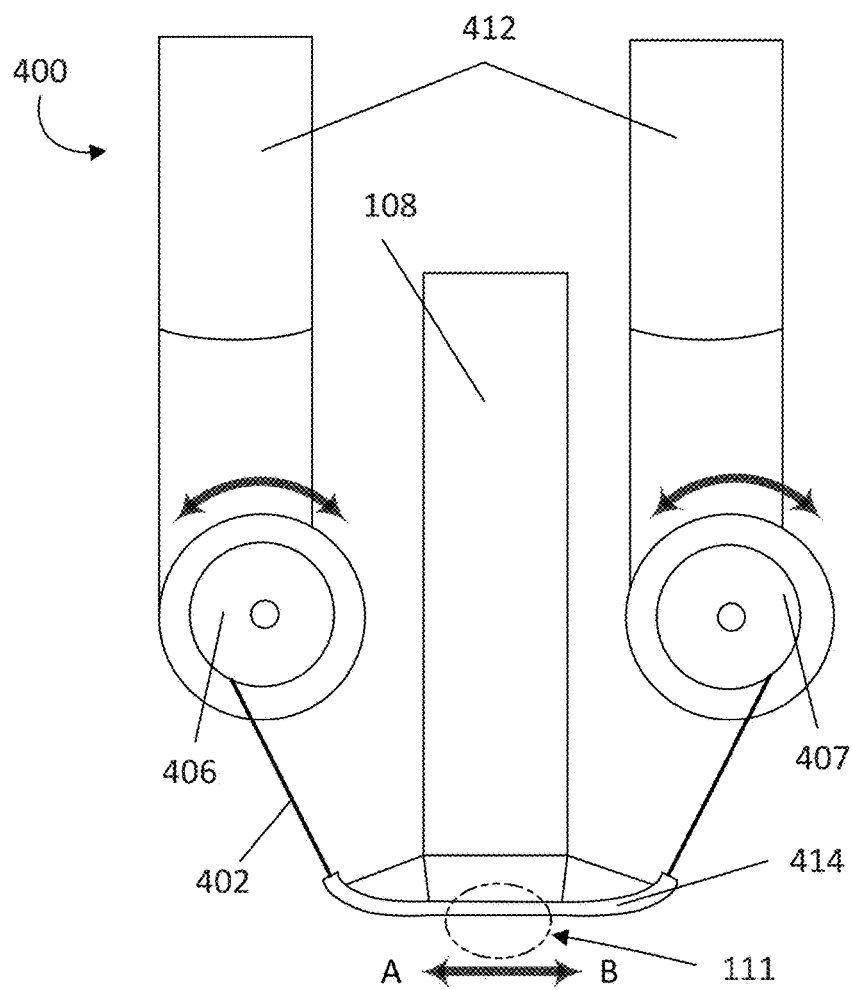
FIG. 4 illustrates yet another view of the example of a cutting device using a ribbon as illustrated in FIG. 2.
Figure 5:
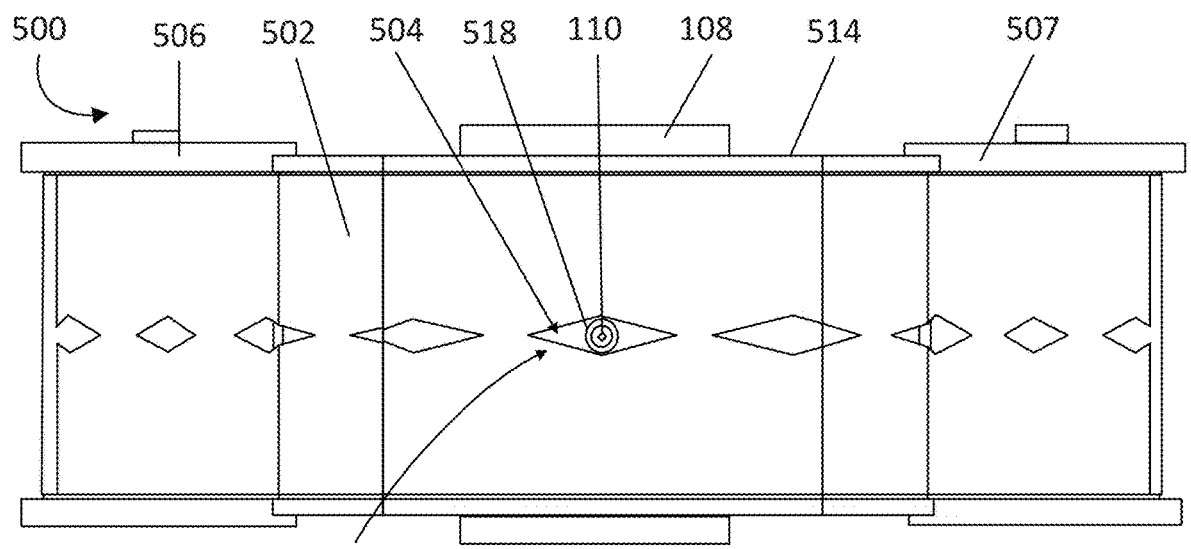
FIG. 5 illustrates yet another view of the example of a cutting device using a ribbon as illustrated in FIG. 2.

FIG. 4 and FIG. 5 illustrate further examples of a cutting device using a ribbon as illustrated in FIG. 2, in accordance with one or more embodiments. Cutting device 400 may be an alternate view of cutting device 200 and/or 300. According to various embodiments, device 400 may include ribbon 402, left reel 406, right reel 407, motors 412, and guide 414. In some embodiments, cutting device 400 may be coupled to an extruder 108 in manufacturing system 100, as described in FIG. 1, or other manufacturing system. In some embodiments, feedstock pass through zone 111 may comprise a volume of space that may be located at the extruding end of extruder 108. In various embodiments, feedstock pass through zone 111 may comprise various shapes and volumes depending on the cutting mechanism. For example, as shown in FIG. 3, a partial perimeter of feedstock pass through zone 111 is at least partially defined by perforation 304-2 such that feedstock pass through zone is substantially teardrop shaped. Alternatively, as shown in FIG. 5, a partial perimeter of feedstock pass through zone 111 is at least partially defined by perforation 504 such that feedstock pass through zone is substantially diamond shaped. Cutting device 500 may be an alternate view of cutting device 200, 300, and/or 400. According to various embodiments, device 500 may include ribbon 502, perforations 504, left reel 506, right reel 507, guide 514, and guide aperture 518. In some embodiments, cutting device 500 may be coupled to an extruder 108 with opening 110, as shown in FIG. 1. One or more perforations 504 may align with opening 110 and define at least a partial perimeter of feedstock pass through zone 111. As shown in FIG. 5, perforations 504 are diamond shaped, however, in other embodiments, perforations 504 may comprise various other shapes. In other embodiments, cutting device 500 may be coupled to a different manufacturing system.

Figure 6:
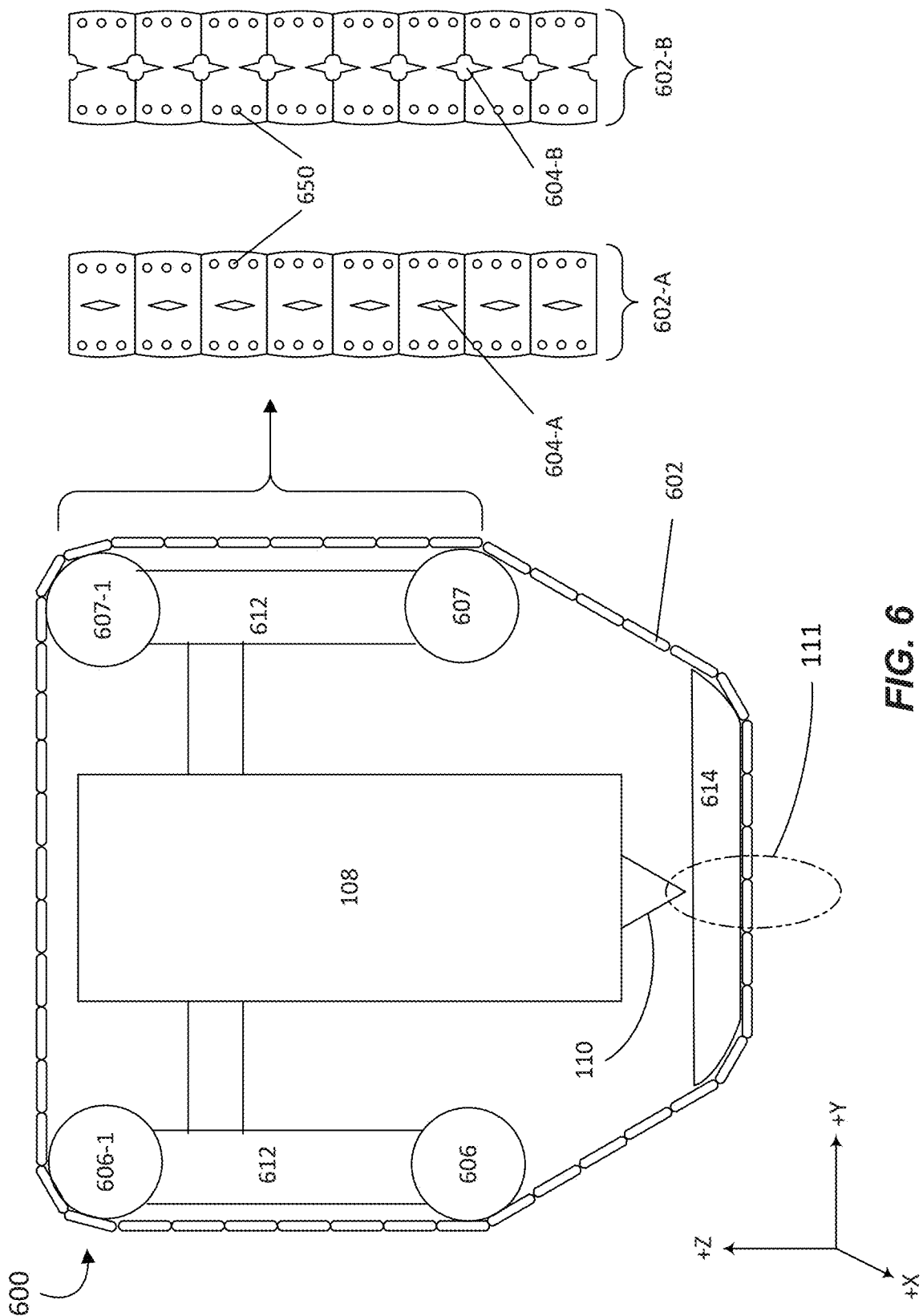
FIG. 6 illustrates an example of a cutting device using a continuous ribbon, in accordance with one or more embodiments.

FIG. 6 illustrates an example of a cutting device using a continuous ribbon, in accordance with one or more embodiments. According to various embodiments, cutting device 600 may include ribbon 602, reel 606, reel 606-1, reel 607, reel 607-1, motors 612, and guide 614. In some embodiments, cutting device 600 may be coupled to an extruder 108 with opening 110, as shown in FIG. 1. According to various embodiments, ribbon 602 may comprise a continuous band structure. In the embodiment shown in FIG. 6, a ribbon 602 forming a continuous band may comprise multiple link plates that couple together by joint hinges to form a continuous track of link plates. Ribbons 602-A and 602-B represent an alternate view of various embodiments of ribbon 602. In some embodiments, perforations 604-A may be included within each link plate as shown as ribbon 602-A. In other embodiments, perforations 604-B may be formed by the shape of two adjacent link plates, as shown as ribbon 602-B. Perforations 604-A or 604-B may define at least a partial perimeter of feedstock pass through zone 111 which may comprise a volume of space located near opening 110. In some embodiments, ribbon 602 may wind around reels 606 and 607. However, in other embodiments the link plates may form a continuous track of link plates without an end as shown in FIG. 6. In such embodiments, the continuous track of link plates may instead wrap around an edge of each reel 606 and 607. In some embodiments, cutting device 600 may include additional guides or reels, such as reels 606-1 and 607-1, which act as support reels to control movement and/or placement of ribbon 602. In some embodiments, each reel 606, 606-1, 607, and 607-1 may be coupled to a motor arrangement including motor 612. In some embodiments, each reel 606, 606-1, 607, and 607-1 may include one or more protrusions, such as sprockets and/or claws, as described above to grip and move the track of link plates of ribbon 602. In some embodiments, the protrusions may align with perforations 604 to grip ribbon 602 at the point of contact. In other embodiments, the protrusions may align with perforations along the edge of the ribbon, shown as edge perforations 650 in ribbons 602-A and 602-B. The protrusions may grip ribbon 602, 602-A, and/or 602-B by passing through edge perforations 650 and gripping ribbon 602, 602-A and/or 602-B at the point of contact.

Figure 7A:
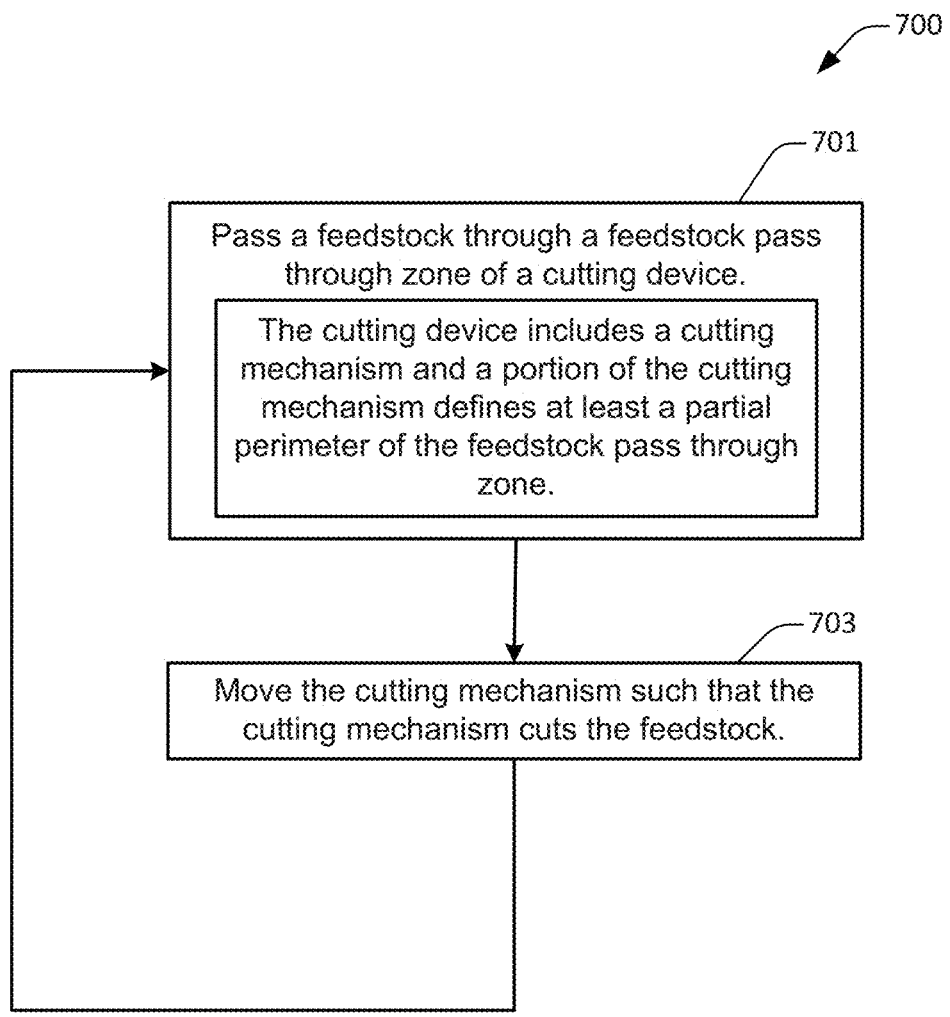
FIG. 7A illustrates an example of a method of cutting material with a cutting device in accordance with one or more embodiments.

FIG. 7A illustrates an example of a method 700 of cutting material with a cutting device in accordance with one or more embodiments. At 701, a feedstock is passed through a feedstock pass through zone of a cutting device. In some embodiments, the cutting device may include a cutting mechanism and a portion of the cutting mechanism defines at least a partial perimeter of the feedstock pass through zone. In some embodiments, the feedstock may be extruded material 118 and may comprise a continuous fiber reinforced composite. In some embodiments, the feedstock may be extruded by extruder 108 through one or more openings, such as opening 110. In some embodiments, the cutting device may be cutting device 300 that includes a cutting mechanism, such as ribbon 302. In some embodiments, ribbon 302 may include one or more perforations such as perforation 304-2. In some embodiments, the feedstock pass through zone may be feedstock pass through zone 111. A perforation 304-2 that is substantially aligned with an opening, may define at least a partial perimeter of the feedstock pass through zone. Alternatively, the cutting device may be one of various embodiments described in the present disclosure.

At 703, the cutting mechanism, such as ribbon 302, is moved such that the cutting mechanism cuts the feedstock, such as extruded material 118. Movement of the cutting mechanism, such as ribbon 302, may be caused by one or more motor arrangements including a motor, such as motor 312, and a gear arrangement, such as gear drive 310. The movement of the motor arrangements may be controlled by a controller, such as controller 102. The movement of the cutting mechanism causes the material to be cut in different ways based on the various embodiments in the present disclosure.

Figure 7B:
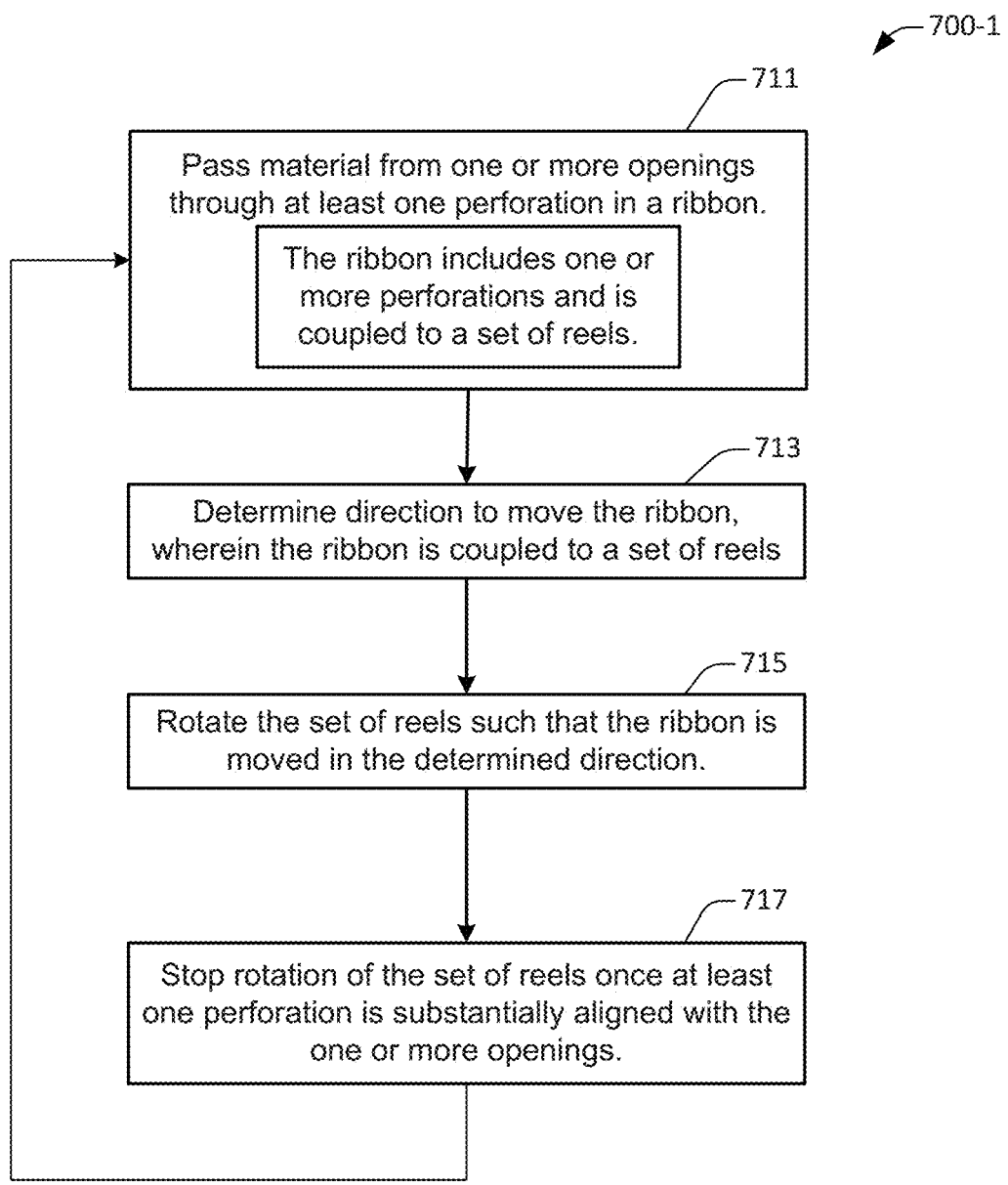
FIG. 7B illustrates an example of a method of cutting material using a ribbon, in accordance with one or more embodiments

FIG. 7B illustrates an example of a method 700-1 of cutting material using a ribbon, in accordance with one or more embodiments. At 711, material is passed from one or more openings through at least one perforation in a ribbon. In some embodiments, the ribbon includes one or more perforations. In some embodiments, the ribbon may be ribbon 302, and the perforations may be perforations 304, which define at least a partial perimeter of a feedstock pass through zone, such as feedstock pass through zone 111, as described in FIG. 3. In some embodiments, passing material, such as extruded material 118, through a perforation, such as perforation 304-2, comprises passing material through a feedstock pass through zone as described in step 701 of method 700. In some embodiments, the material may be a continuous carbon fiber reinforced composite material extruded from an opening of an extruder in a manufacturing system, such as manufacturing system 100 described in FIG. 1. In some embodiments, the ribbon may include one or more perforations that are centrally lined along the length of the ribbon. In some embodiments, the perforations are spaced evenly apart. In other embodiments, the perforations may be organized in various arrangements on the ribbon. In some embodiments, the material is extruded through more than one opening and passed through more than one perforation in the ribbon simultaneously. In certain embodiments of manufacturing system 100, an extruder, such as extruder 108 may include a motor or any other suitable mechanism for pushing the thermoplastic material through a chamber and out an opening. In some embodiments, the amount and/or rate of material to be extruded and passed through the perforation may be calculated and determined by a controller, such as controller 102 as described in FIG. 1.

At 713, a direction to move the ribbon is determined. In some embodiments, the ribbon is coupled to a set of reels. In some embodiments, the set of reels may include left reel 206 and right reel 207 as shown in FIG. 2. Such determination may be made by a controller, such as controller 102 as described in FIG. 1. For example, as shown in FIG. 2, ribbon 202 may be moved in either direction A or direction B. In various embodiments, different parameters may determine which direction to move the ribbon. For example, as shown in FIG. 2, ribbon 202 may be moved in direction A until ribbon 202 has been substantially unwound from right reel 207. Once, ribbon 202 has been substantially unwound from right reel 207, the controller may determine to move ribbon 202 in direction B so that ribbon 202 is passed from left reel 206 to right reel 207. In other embodiments, a controller may be programmed to alternate the direction of the ribbon based on various parameters and/or instructions.

Once the ribbon's direction has been determined, the set of reels is rotated to move the ribbon in the predetermined direction at 715. At 715, the set of reels may be rotated such that the ribbon is moved from a first reel to a second reel in a first direction. For example, as shown in FIG. 2, a controller may determine to spin both reels 206 and 207 in a clockwise direction in order to move ribbon 202 from right reel 207 to left reel 206 in direction A. Alternatively, the set of reels is rotated such that the ribbon is moved from the second reel to the first reel in a second direction. For example, as shown in FIG. 2, a controller may determine to rotate both reels 206 and 207 in a counterclockwise direction in order to move ribbon 202 from left reel 206 to right reel 207 in direction B. In various embodiments, depending on how the ribbon is wound around each reel, the controller may determine to rotate either reel in a clockwise and/or counterclockwise direction to cause ribbon to move in a desired direction. The ability to move the reel in either direction for cutting would provide double the cutting edges in the same length of ribbon as compared to a device with the ability to move the ribbon in only one direction.

The movement of the ribbon cuts the material by causing one or more edges of the perforation to press against the material with enough force to slice through the material. In some embodiments, the perforations may include sharpened edges, which enable greater cutting ability for each perforation. In further embodiments, the perforations may be "teardrop" shaped with a relatively wider center portion that is rounded and tapers toward a sharpened point, as shown in FIG. 3. For example, as ribbon 302 moves along reels 306 and 307, the tapered point of such teardrop shaped perforations 304 presses against the material to allow for a concentrated cut force on the material. In further embodiments, the perforations may be symmetrically shaped to allow for cutting by movement of the ribbon in two directions, such as direction A and direction B as shown in FIGS. 2 and 3.

At 717, the rotation of the reels and movement of the ribbon is stopped once a subsequent perforation is substantially aligned with the opening. For example, as shown in FIG. 3, ribbon 302 may be moved in direction A to sever material passed through perforation 304-2. Ribbon 302 may continue moving in direction A until perforation 304-1 is substantially aligned with opening 110. Once a subsequent perforation, such as perforation 304-1, is substantially aligned with the opening, additional material may be passed through the subsequent perforation at 701. The movement of ribbon 302 may be controlled by a controller such as controller 102 as described in FIG. 1. In some embodiments, a controller may be programmed to move and stop ribbon 302 based on various parameters and/or instructions. Such parameters and/or instructions may include the distance between each perforation 304. In other embodiments, the controller may detect when a perforation 304 has substantially aligned with opening 110 by a sensor mechanism (not shown).

For example, as shown in FIG. 3, once perforation 304-1 is substantially aligned with opening 110, additional material may be passed through perforation 304-1 until it is at a desired length, at which point ribbon 302 is moved in either direction A or B to sever the additional material. Utilizing a subsequent new perforation 304 after each cut ensures a fresh cut surface with optimal cutting capability for each new cut without loss in performance.

Figure 8A:
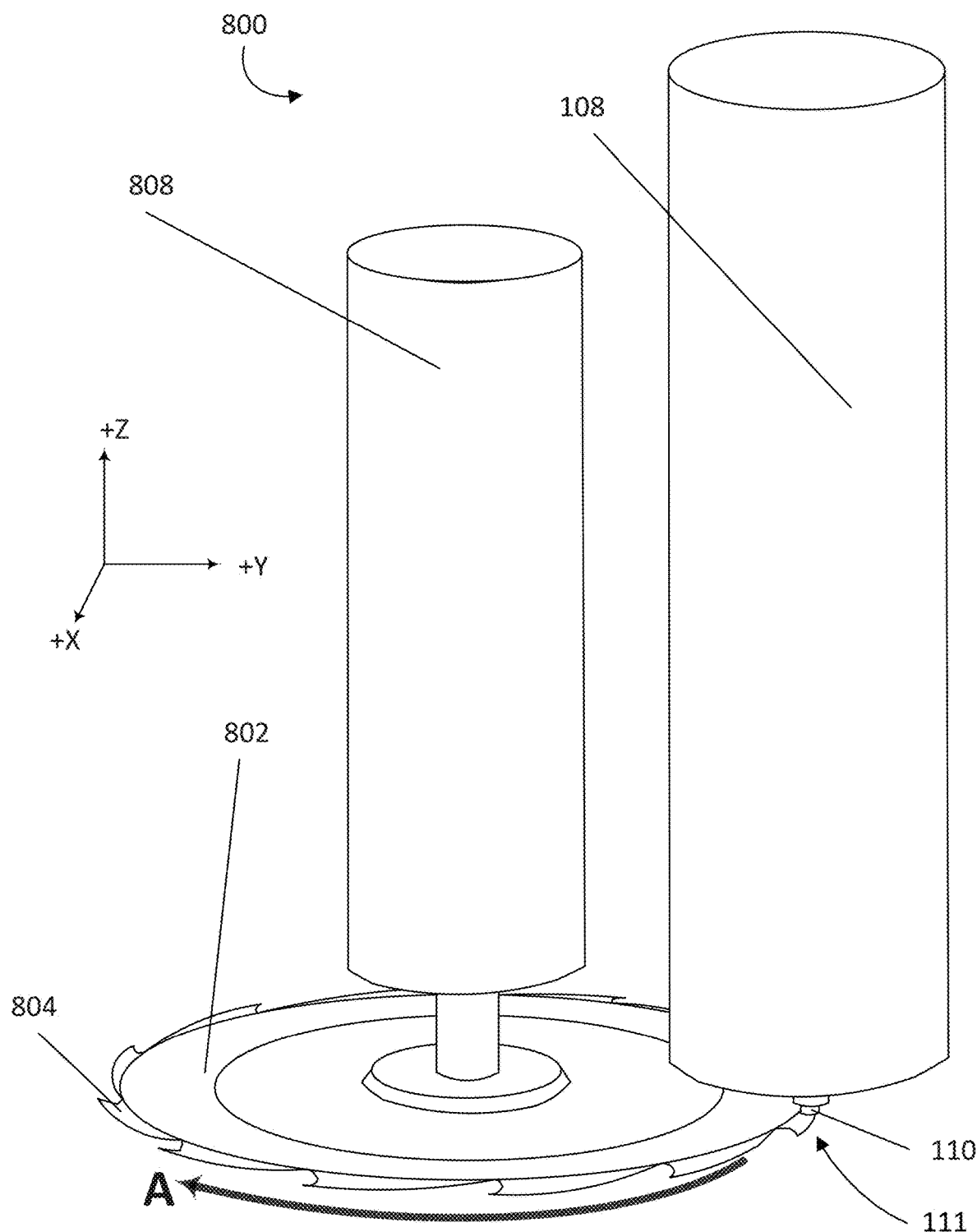
FIG. 8A illustrates an example of a cutting device using a disk, in accordance with one or more embodiments.

FIG. 8A illustrates an example of a cutting device 800 using a disk 802, in accordance with one or more embodiments. FIG. 8B illustrates an alternate view of the example of a cutting device using a disk as shown in FIG. 8A. According to various embodiments, cutting device 800 may include disk 802, blade structure 804, cavities 806 including cavity 806-1, cavity 806-2 and cavity 806-3, sharpened edge 807, and motor 808. In some embodiments, cutting device 800 may be coupled to an extruder 108 with opening 110 and feedstock pass through zone 111 located near opening 110, as shown in FIG. 1. In some embodiments, cutting device 800 comprises a relatively flat disk structure 802. As shown in FIG. 8A, disk 802 is flat on an X-Y plane with negligible thickness in the direction of the Z axis. In other embodiments, the thickness of disk 802 may be more than negligible, but not enough to significantly impinge upon the build space. In some embodiments disk 802 comprises multiple blade structures 804 which may be lined around the circumference of disk 802. Blade structures 804 are shaped and positioned such that each blade structure 804 forms a cavity, such as cavity 806-2 (shown in FIG. 8B) which defines at least a partial perimeter of feedstock pass through zone 111. Material is extruded by extruder 108 through feedstock pass through zone 111. In some embodiments, one or more openings 110 may extrude material through at least one cavity 806 substantially aligned with one or more openings 110. In FIG. 8B, cavity 806-2 is substantially aligned with opening 110. In other embodiments, multiple openings 110 may be aligned with at least one cavity 806. In some embodiments, material may be passed through the cavity 806-2 in a direction substantially in the Z-axis and substantially perpendicular to the X-Y plane.

In various embodiments, each cavity 806 may include sharpened edges 807 outlining each cavity. In other embodiments, one or more cavities may be substantially teardrop shaped, such as cavity 806-3, including a relatively wider portion that tapers toward a sharpened point. In some embodiments, the wider portion may be large enough for a nozzle of opening 110 to protrude through. Once material has been extruded from extruder 108 and passed through at least one cavity 806 at a desired length, rotation of the disk cuts the material by causing the cavity to press against and slice through the material. A cavity 806 with a tapered shape such as a teardrop shape may allow for a more concentrated cut force. In FIG. 8A, disk 802 is rotated clockwise in direction A on the Z axis. In other embodiments, blade structures 804 may be shaped symmetrically such that cutting may occur by rotating disk 802 in an opposite counterclockwise direction. In other embodiments, one or more cavities 806 may comprise a fully enclosed perforation within each blade structure 804, such as cavity 806-3.

According to other embodiments, disk 802 may be coupled to a motor arrangement comprising motor 808 which drives rotational movement of disk 802 in direction A. In various embodiments, motor 808 may comprise a DC motor, stepper motor and/or servo motor. Certain embodiments the motor arrangement may include multiple motors. In other embodiments the motor arrangement may include a transmission and gear arrangement.

In some embodiments, blade structures 804 are positioned to be flush with a nozzle or needle of opening 110. In further embodiments, disk 802 may be retractable so that a nozzle of opening 110 may protrude through a cavity 806 that is substantially aligned with opening 110. For example, disk 802 in FIG. 8A may retract upwards in the +Z direction. This may limit obstruction of blade structure 804 during extrusion of material. Once material has been extruded at a desired length, disk 802 may extend down the −Z direction such that a blade structure 802 is flush with a nozzle of opening 110 along the Z axis. After such extension, motor 808 causes rotation of disk 802 to cut the extruded material. In other embodiments, extruder 108 may retract or extend in relation to disk 802 to relieve obstruction of opening 110. In further embodiments, cutting device 800 may be rotatable around extruder 108 to eliminate and/or reduce obstruction with build object 114.

Figure 9:
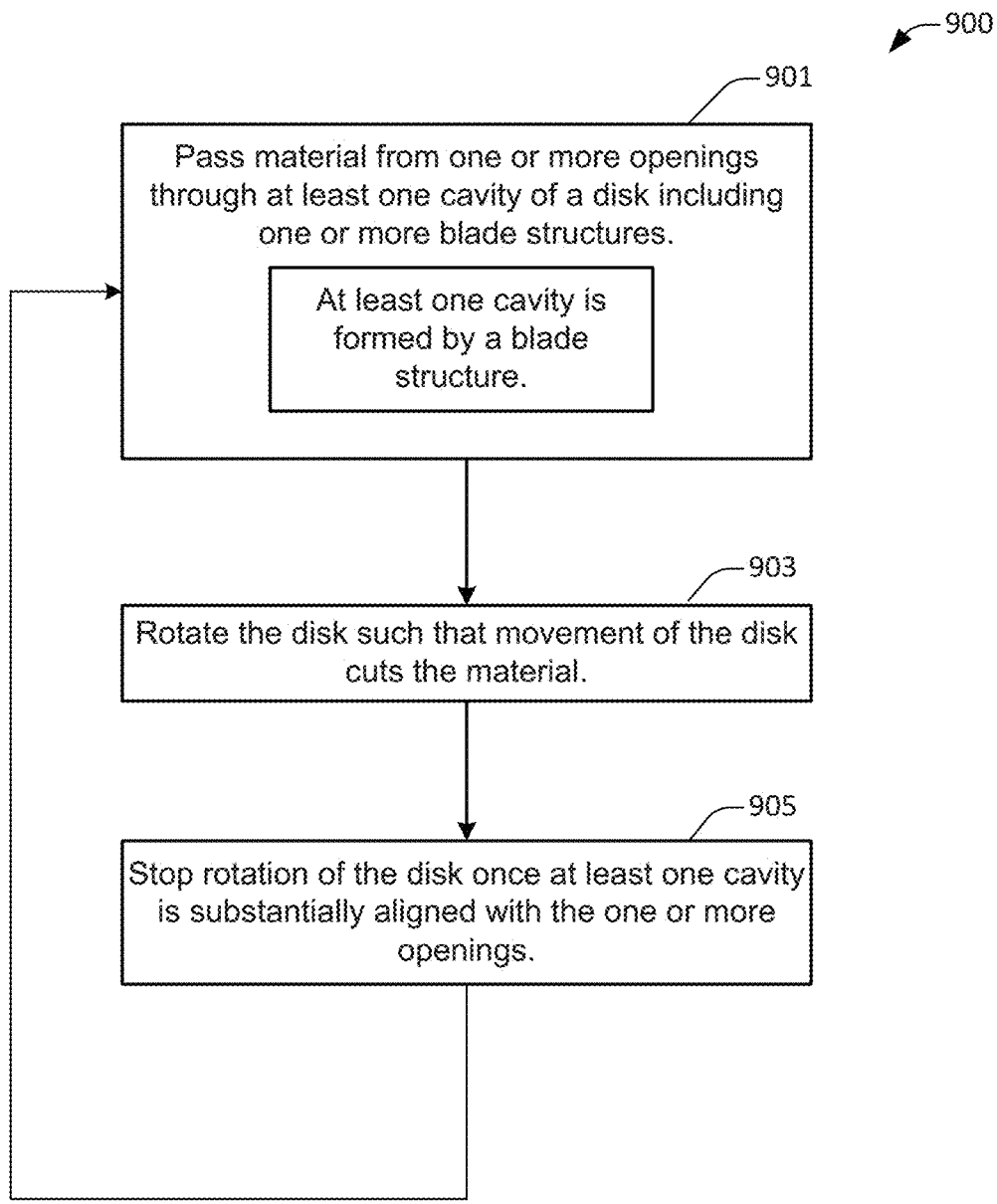
FIG. 9 illustrates an example method of cutting material using a disk, in accordance with one or more embodiments.

FIG. 9 illustrates an example method 900 of cutting material using a disk, in accordance with one or more embodiments. At 901, material is passed from one or more openings through at least one cavity of a disk including one or more blade structures. In some embodiments, at least one cavity is formed by a blade structure. For example, the one or more openings may be opening 110 of extruder 108 as shown in FIGS. 1, 8A, and 8B. The disk may be disk 802 with cavities 806 formed by blade structures 804. A cavity 806 substantially aligned with opening 110 may define at least a partial perimeter of the feedstock pass through zone, such as feed stock pass through zone 111. In some embodiments, passing material, extruded material 118, through cavity 806 may comprise passing material through a feedstock pass through zone as described in step 701 in method 700. In certain embodiments, the blade structures may be symmetrically shaped with one or more cavities on either side. In other embodiments, the cavities may comprise one or more fully enclosed perforations in each blade structure. In some embodiments, the material may be a continuous carbon fiber reinforced composite extruded used in a fused deposition modeling system. In certain embodiments, an extruder, such as extruder 108 may include a motor or any other suitable mechanism for pushing the material through a chamber and out an opening. In some embodiments, the amount and/or rate of material to be extruded and passed through the perforation may be calculated and determined by a controller, such as controller 102 as described in FIG. 1.

At 903, the disk is rotated such that movement of the disk cuts the material. As shown in FIG. 8B, disk 802 is rotated in direction A to cut the material passed through cavity 806-2. However, in embodiments where the blade structures are symmetrically shaped or where the cavities comprise one or more fully enclosed perforation, material may be cut by either a clockwise or counterclockwise rotation. In some embodiments rotation of the disk may cause a sharpened edge of a cavity to press against the material and slice the material. In some embodiments, a teardrop shaped cavity may provide a concentrated cut force at the tapered end. Rotation of the disk may be caused by a motor arrangement including one or more motors, such as motor 808.

At 905, rotation of the disk is stopped once at least one cavity is substantially aligned with the one or more openings. For example, as shown in FIG. 8B, disk 802 is rotated in direction A such that the sharpened edges of cavity 806-2 cut the material extruded by opening 110. Disk 802 may continue to rotate in direction A until cavity 806-1 is substantially aligned with opening 110. Once a subsequent cavity, such as cavity 806-1, is substantially aligned with the opening, additional material may be passed through the subsequent cavity at 901 and so on. The movement of disk 802 may be controlled by a controller such as controller 102 as described in FIG. 1. In some embodiments, a controller may be programmed to move and stop disk 802 based on various parameters and/or instructions. Such parameters and/or instructions may include the distance between each cavity 806. In other embodiments, the controller may detect when a cavity has substantially aligned with opening 110 by a sensor mechanism (not shown).

Figure 10A:
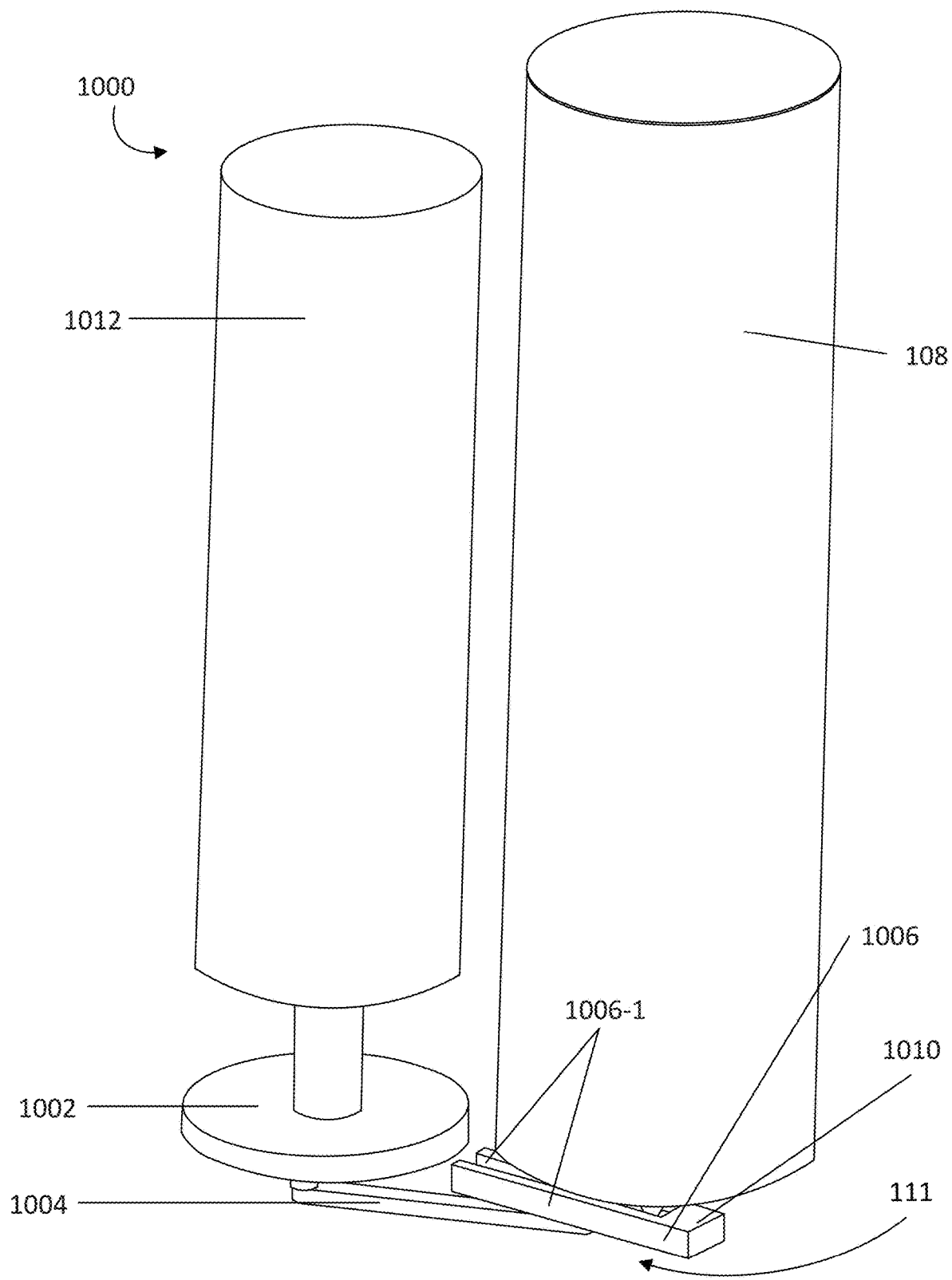
FIG. 10A illustrates an example of a cutting device using a slider-crank, in accordance with one or more embodiments.
Figure 10B:
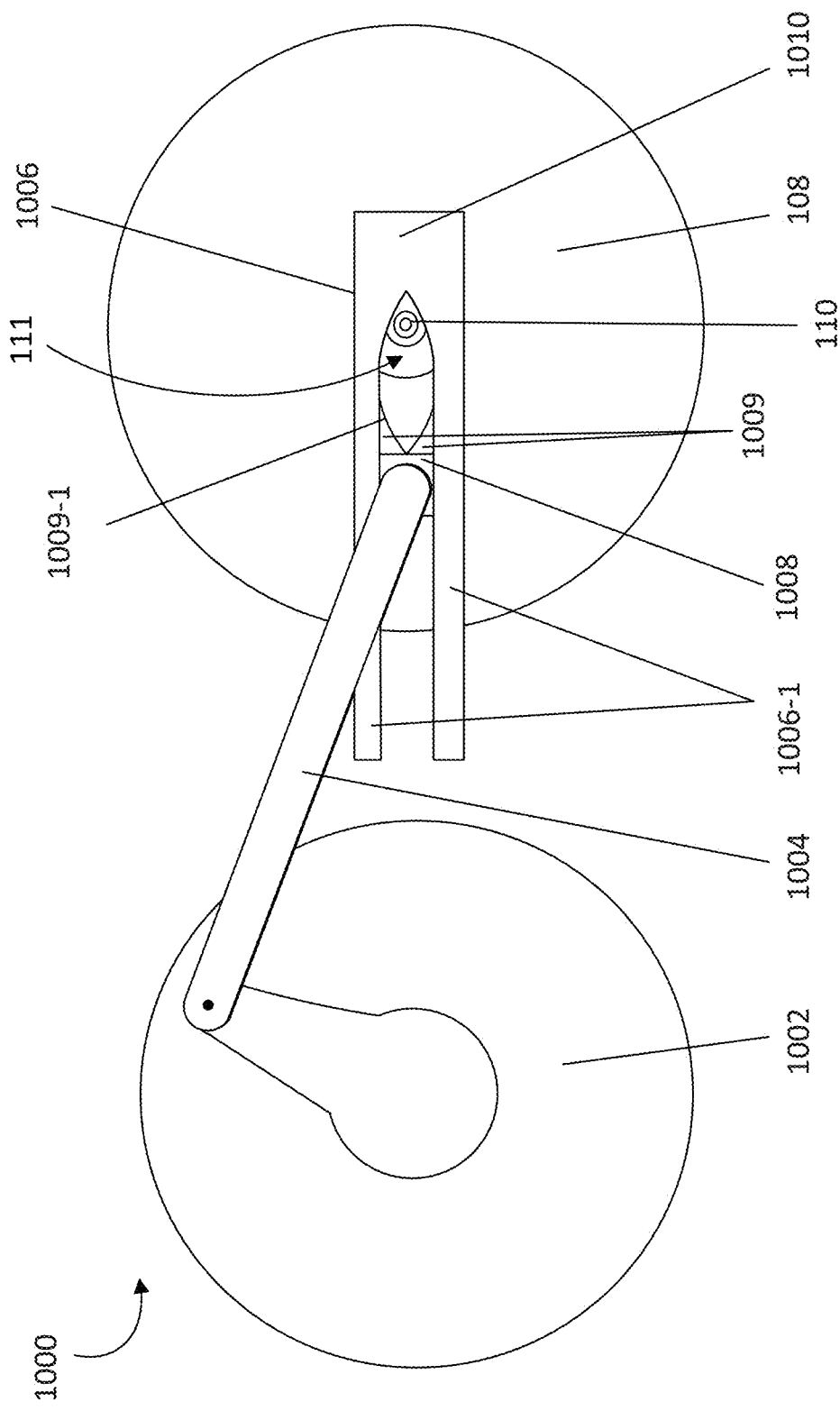
FIG. 10B illustrates an alternate view of the example of a cutting device using a slider-crank as shown in FIG. 10A.
Figure 10C:
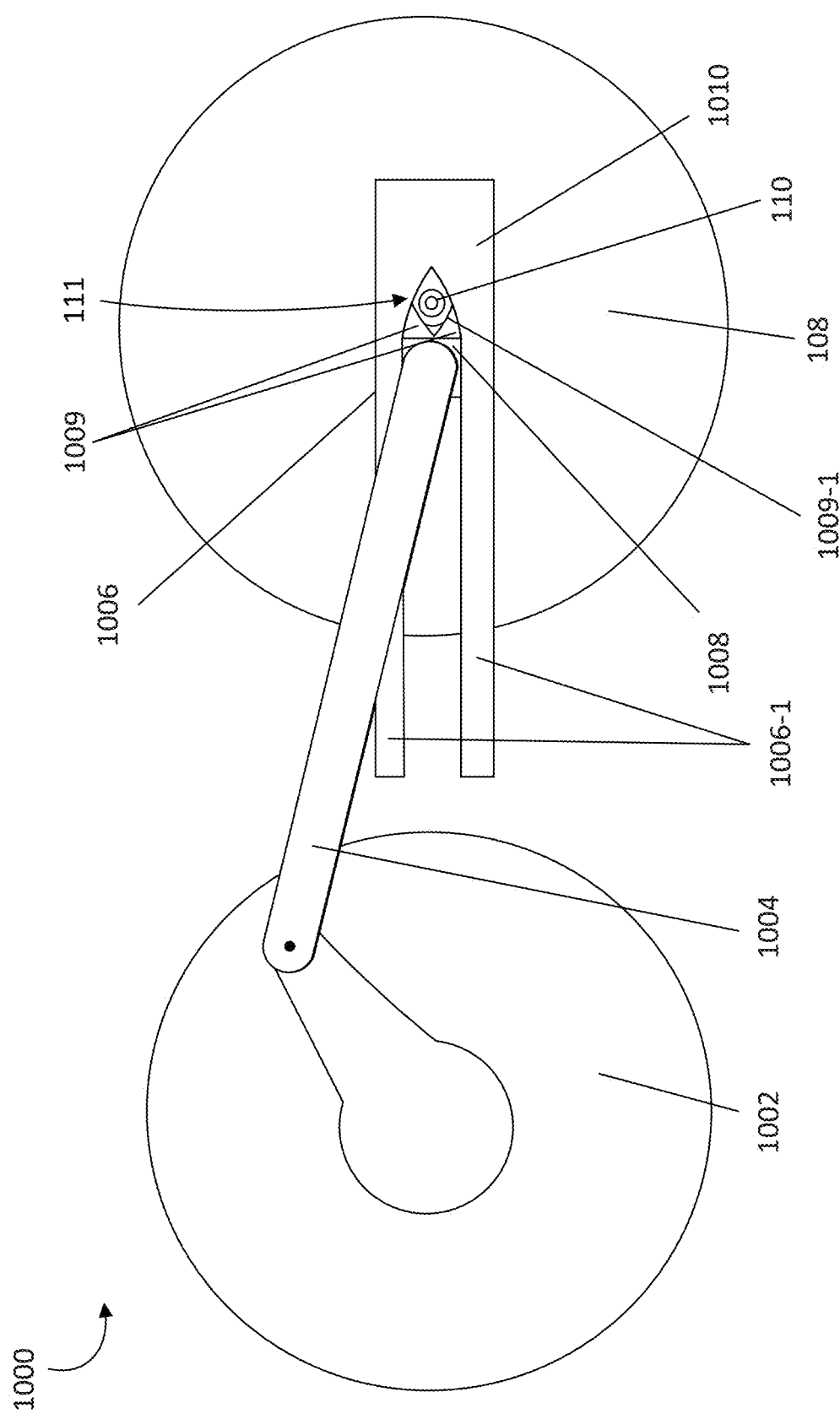
FIG. 10C illustrates yet another view of the example of a cutting device using a slider-crank as shown in FIG. 10A during cutting.

FIGS. 10A, 10B and 10C are further illustrations of an example of a cutting device using a slider-crank, in accordance with one or more embodiments. According to various embodiments, cutting device 1000 may include crank mechanism 1002, connecting rod 1004, guide shaft 1006, rails 1006-1, slider 1008, blade structures 1009, sharpened edge 1009-1, end structure 1010, and motor 1012. FIGS. 10A, 10B, and 10C depict alternate views of cutting device 1000. In some embodiments, cutting device 1000 may be coupled to an extruder 108 with opening 110, as described in FIG. 1. In some embodiments, cutting device 1000 may comprise guide shaft 1006 that includes a set of rails 1006-1 positioned in parallel coupled to slider 1008 such that slider 1008 may move along the length of the rails 1006-1 that may be defined by a first position and a second position. Slider 1008 is coupled to crank mechanism 1002 by connecting rod 1004 which is coupled to crank mechanism 1002 at a point away from the center of crank mechanism 1002. In some embodiments, rotation of crank mechanism causes connecting rod 1004 to move slider along the length of the rails 1006-1. When slider 1008 is at the first position, connecting rod 1004 is parallel to the rails 1006-1 of guide shaft 1006 and slider 1008 is at its closest distance to crank mechanism 1002. When slider 1008 is at the second position, connecting rod 1004 is parallel to the rails 1006-1 of guide shaft 1006 and slider 1008 is at its farthest distance from crank mechanism 1002. In some embodiments, slider 1008 travels from the first position to the second position and back to the first position with each full rotation of crank mechanism 1002.

In some embodiments, crank mechanism 1002 makes a full rotation to return the slider 1008 to the first position after each cut. In some embodiments, the slider will remain in the first position until material is extruded to a desired length. Once another cut is to be made, crank mechanism 1002 may be rotated again to cause another cut. In other embodiments, crank mechanism 1002 may make multiple full rotations for multiple cuts before stopping to ensure that material is completely cut. In further embodiments, cuts may be made by partial rotation of crank mechanism 1002 in opposite directions.

In various embodiments, slider 1008 includes one or more sharpened edges 1009-1. In some embodiments, material may be extruded out of opening 110 and through the parallel rails 1006-1 of guide shaft 1006, which define at least a partial perimeter of feedstock pass through zone 111. In some embodiments, material may be passed out of multiple openings 110. As crank mechanism 1002 rotates, it causes slider 1008 to travel the length of the rails 1006-1 and the sharpened edges of slider 1008 cuts the extruded material. In other embodiments, the rails 1006-1 of guide shaft 1006 may also be coupled to an end structure 1010. In some embodiments, one or more sharpened edges of slider 1008 may press the extruded material against end structure 1010 which may further enable the sharpened edges to slice through the extruded material. In some embodiments, end structure 1010 may also include sharpened edges. In other embodiments, the end structure may be shaped to control movement of one or more blade structures coupled to the slider. For example, as shown in FIGS. 10B and 10C, cutting device 1000 may include a set of blade structures 1009 coupled to slider 1008 at a pivot point. End structure 1010 is shaped with a tapered end such that the set of blade structures are forced together to cut the material as slider 1008 is pushed into the second position by the crank mechanism. In FIG. 10B slider 1008 is at a midpoint on guide shaft 1006 and the blade structures are in an open position. FIG. 10C shows slider 1008 nearing the second position and closer to end structure 1010. In FIG. 10C, the tapered shape of end structure 1010 forces the blade structures into a closed position. Once slider 1008 is completely at the second position, in some embodiments, the blade structure may be forced completely closed. Other embodiments of cutting device 1000 may include various other cutting mechanisms. In further embodiments, cutting device 1000 may be rotatable around extruder 108 to eliminate and/or reduce obstruction with a build object, such as object 114.

Figure 11:
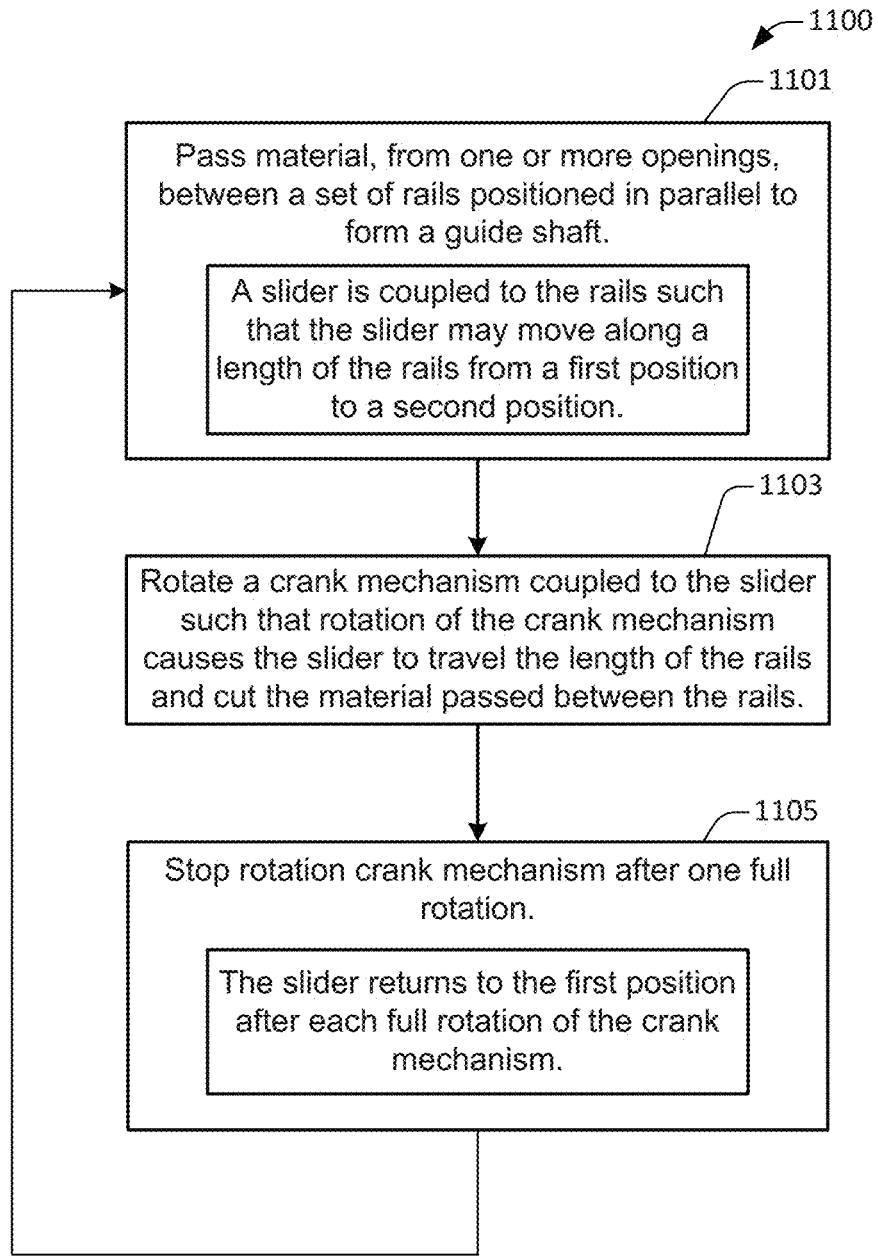
FIG. 11 illustrates an example method of cutting material using a slider-crank in accordance with one or more embodiments.

FIG. 11 illustrates an example method 1100 of cutting material using a slider-crank in accordance with one or more embodiments. At 1101, material is passed from one or more openings between a set of rails positioned in parallel to form a guide shaft. In some embodiments, the set of rails may be rails 1006-1 which define at least a partial perimeter of a feedstock pass through zone, such as feed stock pass through zone 111. In some embodiments, passing material, such as extruded material 118, through the set of rails 1006-1 comprises passing material through a feedstock pass through zone as described in step 701 in method 700. A slider is coupled to the rails such that the slider may move along a length of the rails from a first position to a second position. For example, the one or more openings may be opening 110 of extruder 108 as shown in FIGS. 1, 10B, and 10C. The guide shaft may be guide shaft 1006 with rails 1006-1, and the slider may be slider 1008, as described in FIGS. 10A, 10B, and 10C. In some embodiments, the slider may include one or more sharpened edges. In other embodiments, the slider may include one or more blade structures. In other embodiments, the rails may also be coupled to an end structure, such as end structure 1010 as described in FIGS. 10A, 10B, and 10C. In some embodiments, the material may be a continuous carbon fiber reinforced composite extrusion used in a fused deposition modeling system. In certain embodiments, an extruder, such as extruder 108 may include a motor or any other suitable mechanism for pushing the material through a chamber and out an opening. In some embodiments, the amount and/or rate of material to be extruded and passed through the rails may be calculated and determined by a controller, such as controller 102 as described in FIG. 1.

At 1103, a crank mechanism coupled to the slider is rotated such that the rotation of the crank mechanism causes the slider to travel the length of the rails and cut the material passed between the rails. In some embodiments, the crank mechanism may be crank mechanism 1002. In some embodiments, the crank mechanism may be coupled to the slider by a connecting rod, such as connecting rod 1004. The connecting rod may be coupled to the crank mechanism at a point away from the center such that rotation of the crank mechanism causes the connecting rod to engage slider to travel a length of the guide shaft as described in FIGS. 10A, 10B, and 10C. In some embodiments, as the slider travels toward the second position, the sharpened edges of the slider may cut the material by slicing through the material.

At 1105, rotation of the crank mechanism is stopped after one full rotation. As described in FIGS. 10A, 10B, and 10C, the slider may return to the first position after each full rotation of the crank mechanism. In some embodiments, the slider will remain in the first position until material is extruded at a desired length at 1101. Once another cut is to be made, the crank mechanism is rotated at 1103. In other embodiments, the crank mechanism may make multiple full rotations for multiple cuts before stopping to ensure that material is completely cut. The movement of the crank mechanism may be controlled by a controller such as controller 102 as described in FIG. 1. In some embodiments, a controller such as controller 102 may be programmed to move and stop the crank mechanism 1002 based on various parameters and/or instructions. Such parameters and/or instructions may include a predetermined number of cuts. In other embodiments, the controller may use a sensor mechanism (not shown) to detect if the material has been completely cut and determine if additional cuts are necessary.

Figure 12A:
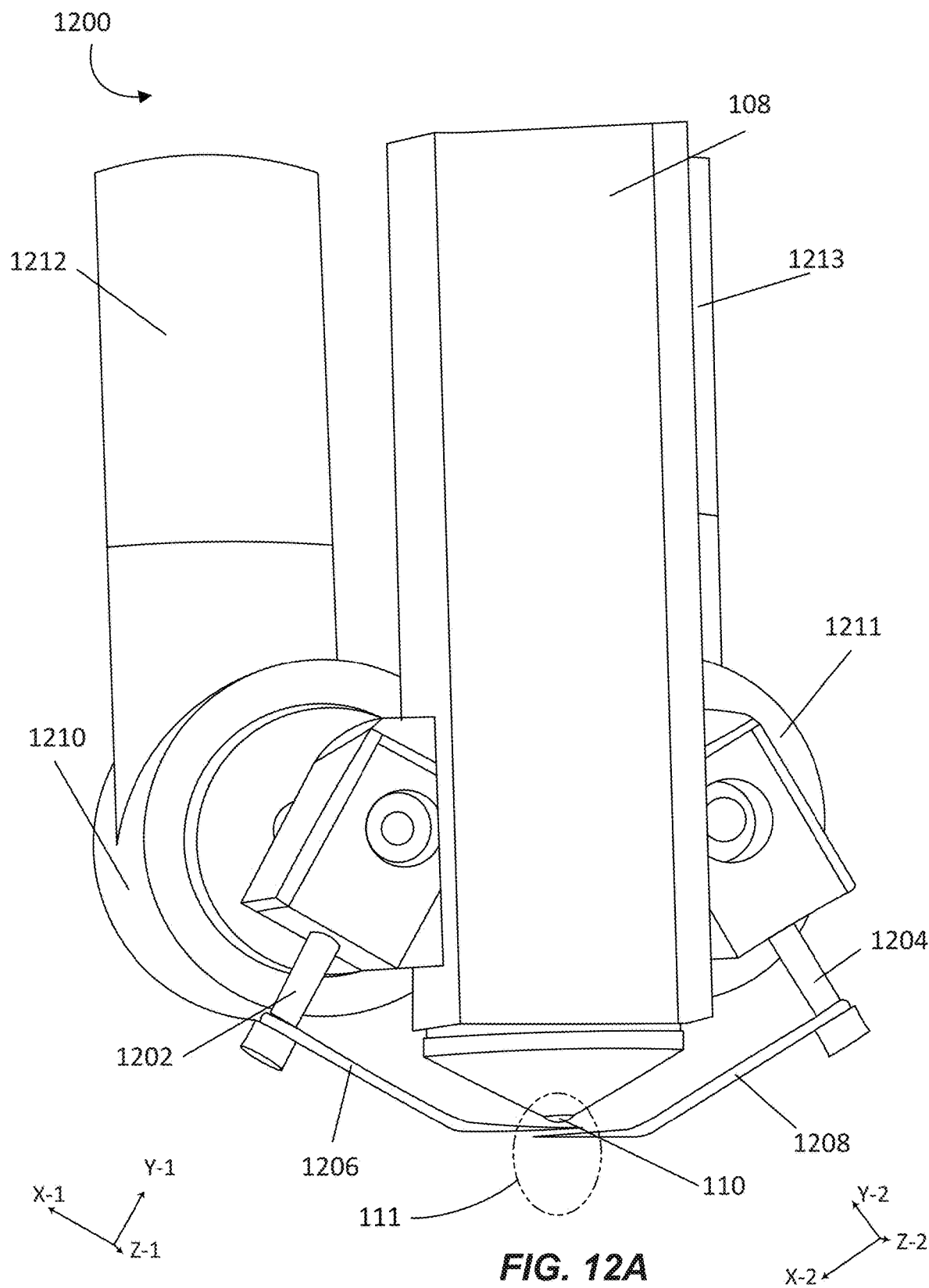
FIG. 12A illustrates an example of a cutting device using a rotating blade structure, in accordance with one or more embodiments.
Figure 12B:
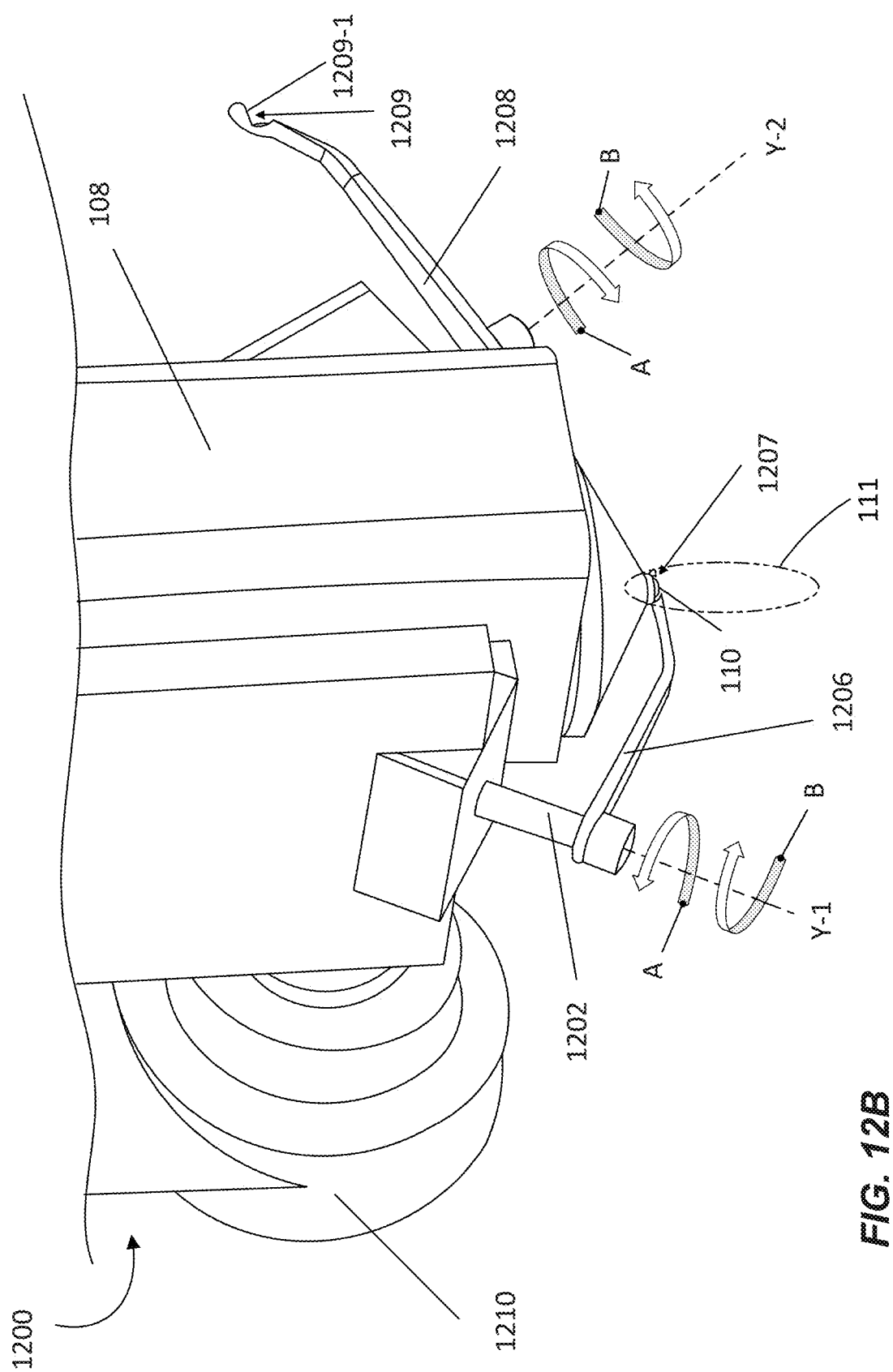
FIG. 12B illustrates an alternate view of the example of a cutting device using a rotating blade structure as shown in FIG. 12A.
Figure 12C:
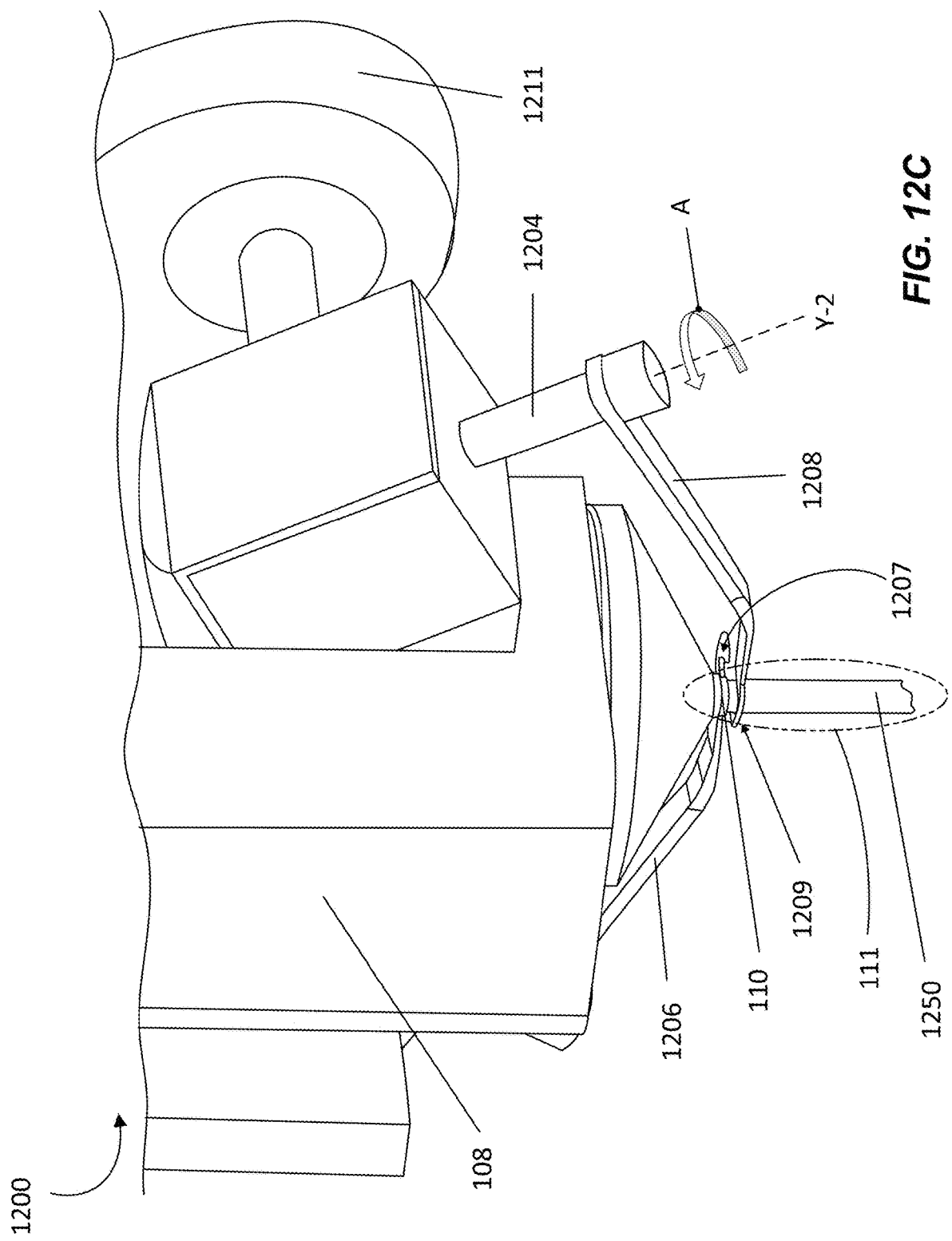
FIG. 12C illustrates an alternate view of the example of a cutting device using a rotating blade structure as shown in FIG. 12A.

FIG. 12A illustrates an example of a cutting device 1200 using a rotating blade structure, in accordance with one or more embodiments. FIG. 12B illustrates an alternate view of the example of a cutting device using a rotating blade structure as shown in FIG. 12A. FIG. 12C illustrates an alternate view of the example of a cutting device using a rotating blade structure as shown in FIG. 12A. According to various embodiments, cutting device 1200 may include rod 1202, rod 1204, blade structure 1206, cavity 1207, blade structure 1208, cavity 1209, sharpened edge 1209-1, gear drive 1210, gear drive 1211, motor 1212, and motor 1213. In some embodiments, cutting device 1200 may be coupled to extruder 108 with opening 110, as described in FIG. 1. In some embodiments, extruder 108 extrudes material 1250 through feedstock pass through zone 111. In some embodiments, material 1250 may comprise a continuous carbon fiber reinforced composite.

In some embodiments, cutting device 1200 may comprise rod 1202 coupled to blade structure 1206 and rod 1204 coupled to blade structure 1208. In some embodiments, rods 1202 and 1204 are canted at an angle such that rod 1202 has an axis of Y-1 and rod 1204 has an axis of Y-2. In some embodiments, blade structures 1206 and 1208 may rotate around an axis of rods 1202 and 1204 respectively. For example, blade structure 1206 rotates on an X-1-Z-1 plane around an axis of rod 1202 in the direction of the Y-1 axis and blade structure 1208 rotates on an X-2-Z-2 plane around an axis of rod 1204 in the direction Y-2 axis. For example, in FIG. 12B, blade structures 1206 and 1208 rotate clockwise in direction A. In some embodiments, feed stock pass through zone 111 may be a volume of space near opening 110. In other embodiments, at least a partial perimeter of feedstock pass through zone 111 may be defined by the area encompassed by the rotation of blade structures 1206 and 1208. In some embodiments, each blade structure 1206 and 1208 may include cavities 1207 and 1209 respectively. In various embodiments, each cavity 1207 and 1209 may include sharpened edges, such as sharpened edge 1209-1, outlining each cavity 1207 and 1209. In other embodiments, one or more cavities 1207 or 1209 may be substantially V-shaped including a relatively wider portion that tapers toward a sharpened point (visible in cavity 1209 in FIG. 12B).

In some embodiments, the rotation of blade structure 1206 causes cavity 1207 to substantially align with extruder 108 such that material 1250 extruded from opening 110 is positioned within cavity 1207. Similarly, the rotation of blade structure 1208 causes cavity 1209 to substantially align with extruder 108 such that material 1250 extruded from opening 110 is positioned within cavity 1209. In some embodiments, material 1250 may be extruded through multiple openings 110 and 110-1, as shown in FIG. 1. In such embodiments, multiple cavities (not shown) may be positioned to align with multiple extrusions of material 1250.

In some embodiments, the rotational motion of blade structures 1206 and 1208 may cause the sharpened edges of cavities 1207 and 1209 to press against the extruded material 1250 and slice through material 1250. A cavity 1209 with a tapered shape such as a V-shape may allow for a more concentrated cut force. As previously described, in FIG. 12B, blade structures 1206 and 1208 rotate clockwise in direction A. In other embodiments, blade structure 1208 may be shaped symmetrically with cavities arranged such that cutting may occur by rotating blade structure 1208 in an opposite direction B as shown in FIG. 12B. In some embodiments, blade structures 1206 and 1208 may be coupled to a motor arrangement comprising motors 1212 and 1213, and gear drives 1210 and 1211. Such motor arrangement may drive rotational movement of blade structures 1206 and 1208 in direction A. In various embodiments, motor 1212 may comprise a DC motor, stepper motor and/or servo motor. Certain embodiments the motor arrangement may include multiple motors. In some embodiments, gear drives 1210 and 1211 may comprise a right angle gear drive. In other embodiments the motor arrangement may include a transmission and gear arrangement (not shown). In some embodiments, blade structures 1206 and 1208 may be rotated at the same time to simultaneously make contact with extruded material 1250. In other embodiments, blade structures 1206 and 1208 may be rotated independently. In other embodiments, blade structures 1206 and 1208 may be rotated in the same or opposite directions.

In some embodiments, blade structure 1206 may be positioned to be flush with opening 110 or with a nozzle (not shown) or needle (not shown) of opening 110 when blade structure 1206 is substantially aligned with opening 110. Blade structure 1208 may be positioned to be flush with the bottom of blade structure 1206 when both blade structures 1206 and 1208 are substantially aligned with opening 110 and intersecting extruded material 1250. In other embodiments, both blade structures 1206 and 1208 are positioned to be flush with a nozzle or needle of opening 110 when it is substantially aligned with opening 110. In some embodiments, the rotation of each blade structure 1206 and 1208 may begin and end with the blade structures 1206 and 1208 at a position away from opening 110 to eliminate obstruction with a build object, such as object 114 described in FIG. 1. With rods 1202 and 1204 canted an angle, obstruction of opening 110 is further minimized when blade structures 1206 and 1208 are in a position away from opening 110. In further embodiments, cutting device 1200 may be rotatable (not shown) around extruder 108 to eliminate and/or reduce obstruction with build object 114.

Figure 13:
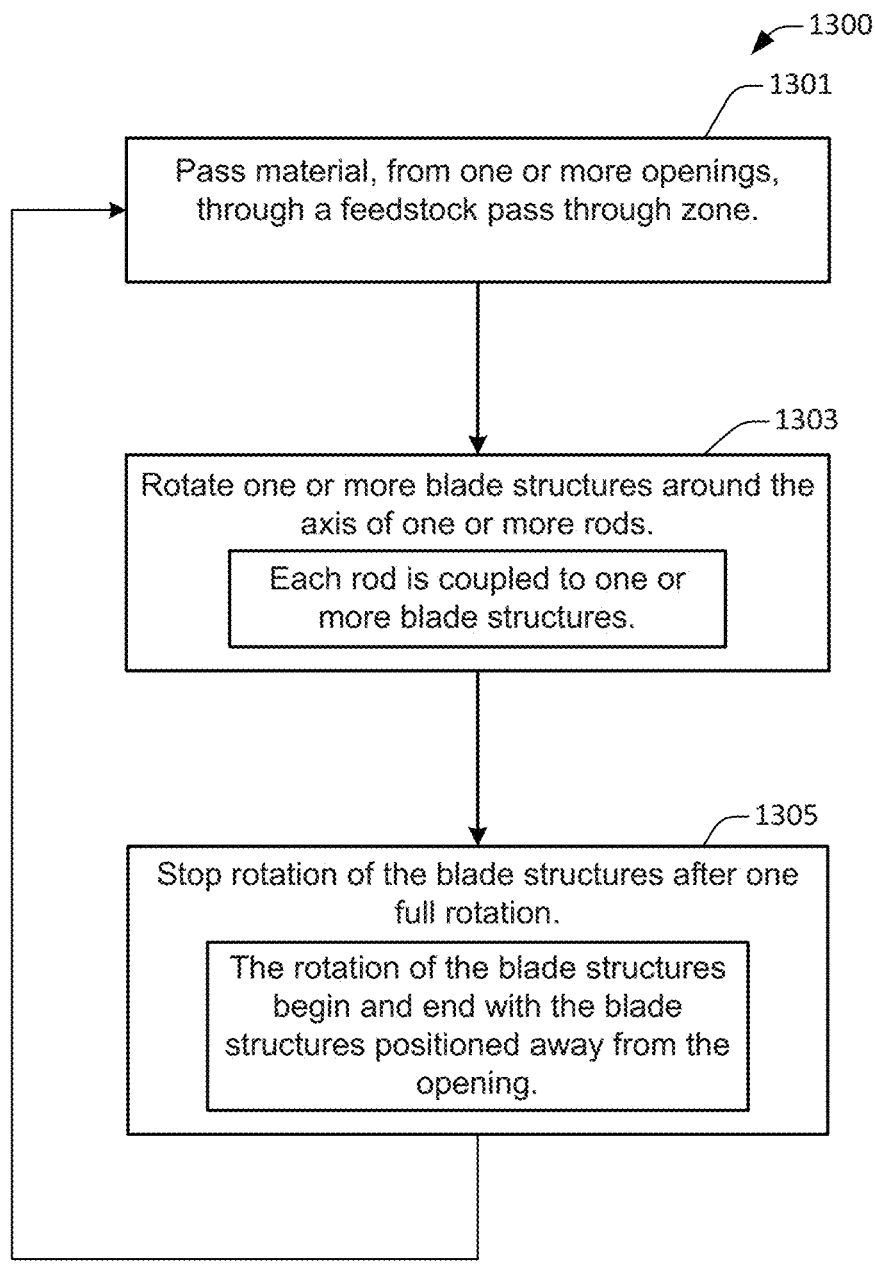
FIG. 13 illustrates an example method of cutting material using a rotating blade structure in accordance with one or more embodiments.

FIG. 13 illustrates an example method of cutting material using a rotating blade structure in accordance with one or more embodiments. At 1301, material is passed from one or more openings through a feedstock pass through zone of a cutting device, such as in step 701 in method 700. In some embodiments, the cutting device may be cutting device 1200 with feedstock pass through zone 111. In some embodiments, passing material, such as extruded material 1250, through feedstock pass through zone 111 comprises passing material through a feedstock pass through zone as described in step 701 in method 700. For example, the one or more openings may be opening 110 of extruder 108 as shown in FIGS. 1, 12A, 12B, and 12C. In some embodiments, the material may be material 1250 as shown in FIG. 12C and may comprise a continuous carbon fiber reinforced composite extrusion used in a fused deposition modeling system. In certain embodiments, an extruder, such as extruder 108 may include a motor or any other suitable mechanism for pushing the material through a chamber and out an opening. In some embodiments, the amount and/or rate of material to be extruded and passed through the feedstock pass through zone may be calculated and determined by a controller, such as controller 102 as described in FIG. 1.

Once material, such as material 1250, has been extruded to a desired length, one or more blade structures are rotated around the axis of one or more rods at 1303. In some embodiments, each rod is coupled to one or more blade structures. The rotation of the blade structures causes one or more of the blade structures to intersect with the feedstock pass through zone and cut the extruded material 1250. In some embodiments the blade structures may be blade structures 1206 and 1208 and the rods may be rods 1202 and 1204, as described in FIG. 12A. In some embodiments, at least a partial perimeter of feedstock pass through zone 111 may be defined by the area encompassed by the rotation of the blade structures 1206 and 1208. In some embodiments, the blade structures may include cavities, such as cavities 1207 and 1209, as described in FIG. 12B. In some embodiments, the cavities may include one or more sharpened edges. In other embodiments, the cavities may be substantially V-shaped with respect to one direction, such as cavity 1209 in FIG. 12B.

At 1305, rotation of the blade structures is stopped after one full rotation. In some embodiments, the rotation of the blade structures may begin and end with the blade structures positioned away from the opening. As described in FIGS. 12A, 12B, and 12C, obstruction of the extruder opening is minimized when the blade structures are positioned away. In some embodiments, the rods may be canted at an angle, such as rods 1202 and 1204 as described in FIG. 12A to further minimize obstruction with the extruder opening. In some embodiments, the blade structures will remain positioned away from the opening until material is extruded at a desired length at 1301. Once another cut is to be made, the blade structures are rotated at 1303. The rotation of the blade structures may be controlled by a controller such as controller 102 as described in FIG. 1. In some embodiments, a controller may be programmed to move and stop the blade structures based on various parameters and/or instructions. Such parameters and/or instructions may include a predetermined degree of rotation. In other embodiments, the controller may use a sensor mechanism to detect the position of each blade structure.

Figure 14:
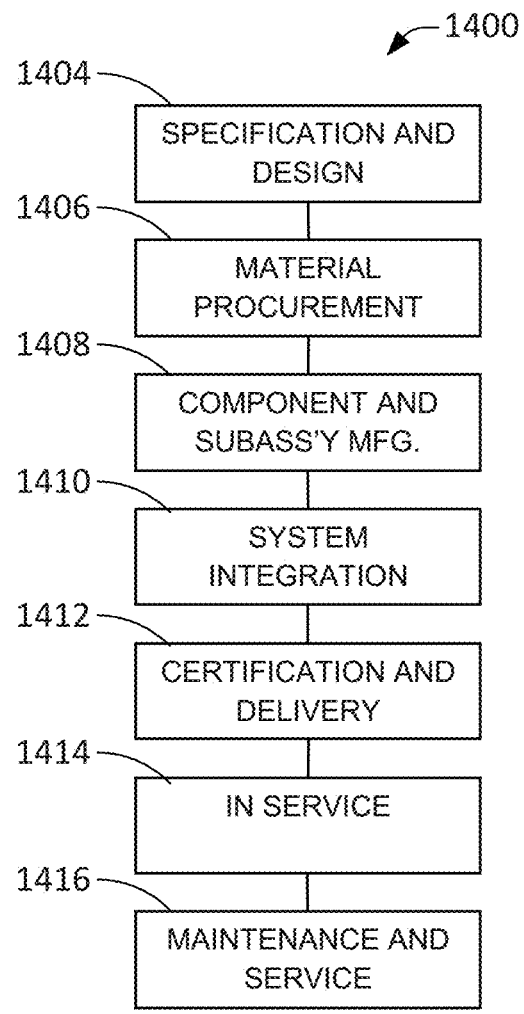
FIG. 14 is a flow diagram of aircraft production and service methodology.
Figure 15:
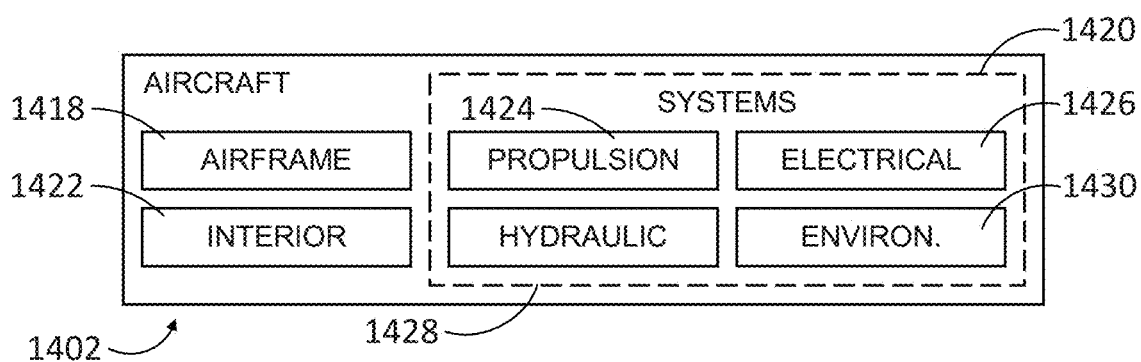
FIG. 15 is a block diagram of an aircraft.

Referring more particularly to the drawings, embodiments of the disclosure may be described in the context of an aircraft manufacturing and service method 1400 as shown in FIG. 14 and an aircraft 1402 as shown in FIG. 15. During pre-production, exemplary method 1400 may include specification and design 1404 of the aircraft 1402 and material procurement 1406. During production, component and subassembly manufacturing 1408 and system integration 1410 of the aircraft 1402 takes place. Thereafter, the aircraft 1402 may go through certification and delivery 1412 to be placed in service 1414. While in service by a customer, the aircraft 1402 is scheduled for routine maintenance and service 1416 (which may also include modification, reconfiguration, refurbishment, and so on).

Each of the processes of method 1400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, the aircraft 1402 produced by exemplary method 1400 may include an airframe 1418 with a plurality of systems 1420 and an interior 1422. Examples of high-level systems 1420 include one or more of a propulsion system 1424, an electrical system 1426, a hydraulic system 1428, and an environmental system 1430. Any number of other systems may be included. Although an aerospace example is shown, the principles of the invention may be applied to other industries, such as the automotive industry. In some embodiments, the previously described embodiments of the present disclosure may be implemented in the construction of one or more portions of airframe 1418 or interior 1422 during component and subassembly manufacturing 1408, system integration 1410, or routine maintenance and service 1416.

Apparatus and methods embodied herein may be employed during any one or more of the stages of the production and service method 1400. For example, components or subassemblies corresponding to production process 1408 may be fabricated or manufactured in a manner similar to components or subassemblies produced while the aircraft 1402 is in service. Also, one or more apparatus embodiments, method embodiments, or a combination thereof may be utilized during the production stages 1408 and 1410, for example, by substantially expediting assembly of or reducing the cost of an aircraft 1402. Similarly, one or more of apparatus embodiments, method embodiments, or a combination thereof may be utilized while the aircraft 1402 is in service, for example and without limitation, to maintenance and service 1416.

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

What is claimed is:

1. A fiber reinforced feedstock cutting device comprising:
a feedstock pass through zone;
a controller; and
a cutting mechanism coupled to the controller, wherein a portion of the cutting mechanism defines at least a partial perimeter of the feedstock pass through zone, wherein the cutting mechanism comprises a disk including a plurality of blade structures positioned continuously along the entire perimeter of the disk, wherein each of the plurality of blade structures is shaped such that a partially enclosed cavity is defined by a curvature of each blade structure ending in a point, each partially enclosed cavity along the perimeter of the disk configured to line up with at least a partial perimeter of the feedstock pass through zone,
wherein the controller is configured to rotate the disk and then stop after rotating a predetermined distance to cut the feedstock, the predetermined distance being the distance between two consecutive partially enclosed cavities,
wherein at least one of the partially enclosed cavities comprises at least one fully enclosed perforation within a blade structure, the at least one fully enclosed perforation including a cutting edge.

2. The cutting device of claim 1, wherein the cutting mechanism comprises:
wherein a feedstock is passed through at least one of the partially enclosed cavities and a rotational movement of the disk cuts the feedstock.

3. The cutting device of claim 1, wherein the plurality of blade structures includes one or more sharpened edges outlining each cavity.

4. The cutting device of claim 1, wherein the plurality of partially enclosed cavities are substantially teardrop shaped with respect to one direction.

5. The cutting device of claim 1, wherein the fully enclosed perforation is substantially teardrop-shaped in at least one direction.

6. The cutting device of claim 1, further comprising one or more motors coupled to the disk, wherein the one or more motors causes the disk to rotate.

7. The cutting device of claim 1, wherein each rotational movement of the disk causes at least one partially enclosed cavity to substantially align with at least one opening of an extruder in a fused deposition modeling system, wherein the extruder includes one or more openings.

8. The cutting device of claim 1, wherein the feedstock comprises a continuous carbon fiber or other continuous fiber reinforced composite.

9. A system of cutting fiber reinforced feedstock comprising:
a source of a feedstock;
an extruder configured to extrude the feedstock from one or more openings through a feedstock pass through zone, wherein the extruder includes one or more openings;
a controller; and
a cutting device including a cutting mechanism coupled to the controller, wherein a portion of the cutting mechanism defines at least a partial perimeter of the feedstock pass through zone, wherein the cutting mechanism comprises a disk including a plurality of blade structures along the entire perimeter of the disk, wherein each of the plurality of blade structures is shaped such that a partially enclosed cavity is defined by a curvature of each blade structure ending in a point, each partially enclosed cavity along the perimeter of the disk configured to line up with at least a partial perimeter of the feedstock pass through zone,
wherein the controller is configured to rotate the disk and then stop after rotating a predetermined distance to cut the feedstock, the predetermined distance being the distance between two consecutive partially enclosed cavities,
wherein at least one of the partially enclosed cavities comprises at least one fully enclosed perforation within a blade structure, the at least one fully enclosed perforation including a cutting edge.

10. The system of claim 9, wherein the cutting mechanism comprises:
wherein a feedstock is passed through at least one of the partially enclosed cavities and a rotational movement of the disk cuts the feedstock.

11. The system of claim 9, wherein the cutting mechanism includes one or more sharpened edges outlining each cavity.

12. The system of claim 9, wherein the plurality of partially enclosed cavities is substantially teardrop shaped with respect to one direction.

13. The system of claim 9, the fully enclosed perforation is substantially teardrop-shaped in at least one direction.

14. The system of claim 9, further comprising one or more motors coupled to the disk, wherein the one or more motors causes the disk to rotate.

15. The system of claim 9, wherein each rotational movement of the disk causes at least one partially enclosed cavity to substantially align with at least one opening of an extruder in a fused deposition modeling system, wherein the extruder includes one or more openings.

16. The system of claim 9, wherein the feedstock comprises a continuous carbon fiber or other continuous fiber reinforced composite.

17. A method for cutting feedstock comprising:
passing a feedstock through a feedstock pass through zone of a fiber reinforced cutting device, the cutting device comprising:
the feedstock pass through zone:
a controller: and
a cutting mechanism coupled to the controller, wherein a portion of the cutting mechanism defines at least a partial perimeter of the feedstock pass through zone, wherein the cutting mechanism comprises a disk including a plurality of blade structures positioned continuously along the entire perimeter of the disk, wherein each of the plurality of blade structures is shaped such that a partially enclosed cavity is defined by a curvature of each blade structure ending in a point, each partially enclosed cavity along the perimeter of the disk configured to line up with at least a partial perimeter of the feedstock pass through zone,
wherein the controller is configured to rotate the disk and then stop after rotating a predetermined distance to cut the feedstock, the predetermined distance being the distance between two consecutive partially enclosed cavities,
wherein at least one of the partially enclosed cavities comprises at least one fully enclosed perforation within a blade structure, the at least one fully enclosed perforation including a cutting edge; and
cutting the feedstock with either one of the partially enclosed cavities or one of the fully enclosed perforations of the cutting mechanism.

18. The method of claim 17, wherein the feedstock is passed through at least one of the partially enclosed cavities and a rotational movement of the disk cuts the feedstock.

19. The method of claim 18, wherein after the feedstock is cut using a rotational movement of the disk, the disk stops moving when a downstream partially enclosed cavity lines up with the feedstock pass through zone.

20. The method of claim 17, wherein the feedstock is cut using a substantially teardrop shaped partially enclosed cavity.

* * * * *